US010917161B2

(12) United States Patent
Chen et al.

(10) Patent No.: US 10,917,161 B2
(45) Date of Patent: Feb. 9, 2021

(54) ELECTRONIC DEVICE AND METHOD FOR WIRELESS COMMUNICATION

(71) Applicant: Sony Corporation, Tokyo (JP)

(72) Inventors: Xiao Chen, Nanjing (CN); Liang Wu, Nanjing (CN); Jian Dang, Nanjing (CN); Zaichen Zhang, Nanjing (CN); Pen-Shun Lu, Taiwan (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/488,249

(22) PCT Filed: Mar. 5, 2018

(86) PCT No.: PCT/CN2018/077982
§ 371 (c)(1),
(2) Date: Aug. 23, 2019

(87) PCT Pub. No.: WO2018/166368
PCT Pub. Date: Sep. 20, 2018

(65) Prior Publication Data
US 2019/0379442 A1   Dec. 12, 2019

(30) Foreign Application Priority Data
Mar. 17, 2017   (CN) .......................... 2017 1 0161135

(51) Int. Cl.
*H04B 7/08*   (2006.01)
*H04B 7/0408*   (2017.01)
*H04B 7/06*   (2006.01)

(52) U.S. Cl.
CPC .......... *H04B 7/088* (2013.01); *H04B 7/0408* (2013.01); *H04B 7/0695* (2013.01)

(58) Field of Classification Search
CPC .... H04B 7/088; H04B 7/0408; H04B 7/0695; G01S 7/023
See application file for complete search history.

(56) References Cited

U.S. PATENT DOCUMENTS

2003/0190897 A1\* 10/2003 Lei ........................ H04B 7/0695
455/101
2003/0203717 A1   10/2003 Chuprun et al.
(Continued)

FOREIGN PATENT DOCUMENTS

CN          102017447 A       4/2011
CN          105515623 A       4/2016
(Continued)

OTHER PUBLICATIONS

Extended European Search Report dated Feb. 4, 2020, issued in corresponding European Patent Application No. 187675259.7.
(Continued)

*Primary Examiner* — Freshteh N Aghdam
(74) *Attorney, Agent, or Firm* — Xsensus LLP

(57) ABSTRACT

Provided are an electronic device and method for wireless communication. The electronic device comprises: a processing circuit configured to: based on the reception of a first signal sent by a remote wireless communication device, selecting one or more candidate wave beams from a predetermined group of wave beams; and acquiring an optimal wave beam pair based on the one or more candidate wave beams, wherein the optimal wave beam pair is the wave beam pair enabling a channel gain to be the maximum.

13 Claims, 15 Drawing Sheets

(56) References Cited

U.S. PATENT DOCUMENTS

| | | | | |
|---|---|---|---|---|
| 2013/0231059 A1* | 9/2013 | Prasad | ............... | H04B 7/0408 |
| | | | | 455/63.4 |
| 2015/0236774 A1* | 8/2015 | Son | ................. | H04B 7/0639 |
| | | | | 375/267 |
| 2016/0285164 A1* | 9/2016 | Choi | ................. | H04B 7/0408 |
| 2017/0155432 A1* | 6/2017 | Kim | ................. | H04W 72/046 |

FOREIGN PATENT DOCUMENTS

| | | |
|---|---|---|
| CN | 106455129 A | 2/2017 |
| EP | 2611043 A1 | 7/2013 |
| WO | 2016/086144 A1 | 6/2016 |

OTHER PUBLICATIONS

International Search Report and Written Opinion dated May 25, 2018 for PCT/CN2018/077982 filed on Mar. 5, 2018, 8 pages including English Translation of the International Search Report.

\* cited by examiner

ELECTRONIC DEVICE AND METHOD FOR WIRELESS COMMUNICATION The present application is based on PCT filing PCT/CN2018/077982, filed Mar. 5, 2018, which claims the priority to Chinese Patent Application No. 201710161135.X, titled "ELECTRONIC DEVICE AND METHOD FOR WIRELESS COMMUNICATION", filed on Mar. 17, 2017 with the China National Intellectual Property Administration, the entire contents of each are incorporated herein by reference.

FIELD OF THE DISCLOSURE

The embodiments of the present disclosure generally relate to the field of wireless communications, in particular to beam management in wireless communications, and more particularly to an electronic apparatus and a method for wireless communications that are capable of providing an optimized beam management scheme.

BACKGROUND OF THE DISCLOSURE

In order to meet the requirements of future mobile communications, large-scale antennas, as one of key technologies, are used to improve spectrum efficiency and increase communication capacity. In addition, the millimeter wave (mmWave) cellular system has become one of the important research directions for future communication due to the large amount of available spectrum resources in the mmWave band. In the mmWave band, in order to resist against large attenuation and support high mobility, it is necessary for the system to largely increase density of antenna elements at the base station end and the user end. However, considering that the cost of analog circuits is too high and the complexity of pure digital processing is too large, the digital-analog hybrid beamforming antenna structure will become the key technology of future communication systems.

Therefore, an efficient and robust beam management strategy is one of the important issues to be solved in future communications.

SUMMARY OF THE DISCLOSURE

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, an electronic apparatus for wireless communications is provided. The electronic apparatus includes processing circuitry, configured to: select, based on receiving of a first signal transmitted from a remote wireless communication device, one or more candidate beams from among a predetermined group of beams; and acquire, based on the one or more candidate beams, an optimal beam pair which is a beam pair maximizing a channel gain.

According to another aspect of the present disclosure, an electronic apparatus for wireless communications is provided. The electronic apparatus includes processing circuitry, configured to: generate a first signal to be transmitted to a remote wireless communication device; and select, based on a second signal transmitted by the remote wireless communication device using each of one or more candidate beams selected based on the first signal, one or more second candidate beams from among a predetermined group of beams, to determine an optimal beam pair which maximizes a channel gain, the optimal beam pair including one of the candidate beams and one of the second candidate beams.

According to another aspect of the present disclosure, a method for wireless communications is provided. The method includes: selecting, based on receiving of a first signal transmitted from a remote wireless communication device, one or more candidate beams from among a predetermined group of beams; and acquiring, based on the one or more candidate beams, an optimal beam pair which is a beam pair maximizing a channel gain.

According to another aspect of the present disclosure, a method for wireless communications is provided. The method includes: generating a first signal to be transmitted to a remote wireless communication device; and selecting, based on a second signal transmitted by the remote wireless communication device using each of one or more candidate beams selected based on the first signal, one or more second candidate beams from among a predetermined group of beams, to determine an optimal beam pair which maximizes a channel gain, the optimal beam pair including one of the candidate beams and one of the second candidate beams.

According to others aspect of the present disclosure, there are further provided computer program codes and computer program products for implementing the methods for the electronic apparatus, and a computer readable storage medium having recorded thereon the computer program codes for implementing the methods described above.

With the electronic apparatus and the method according to embodiments of the present disclosure, the beam scanning range is narrowed by performing selection of candidate beams, so that an optimal beam pair can be determined efficiently, quickly, and accurately.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure.

In the accompanying drawings.

DETAILED DESCRIPTION OF EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

As mentioned above, a digital-analog hybrid beamforming antenna structure may be used in millimeter-wave communications. Pure digital beamforming or pure analog beamforming may also be used in the millimeter-wave communications. The digital beamforming may be implemented by a digital precoder, and the encoded data is connected to the antenna via K Radio Frequency (RF) links configured in parallel with each other, to achieve beam transmission towards a specific direction. In the analog beamforming, the beamforming capability is also referred to as the antenna orientation capability, i.e., the capability to transmit beams in a specific direction. For example, RF links are connected to multiple phase shifters and antennas, and a beam having directivity is formed using at least one RF link, thereby implementing an analog beamforming scheme.

Figure 1:
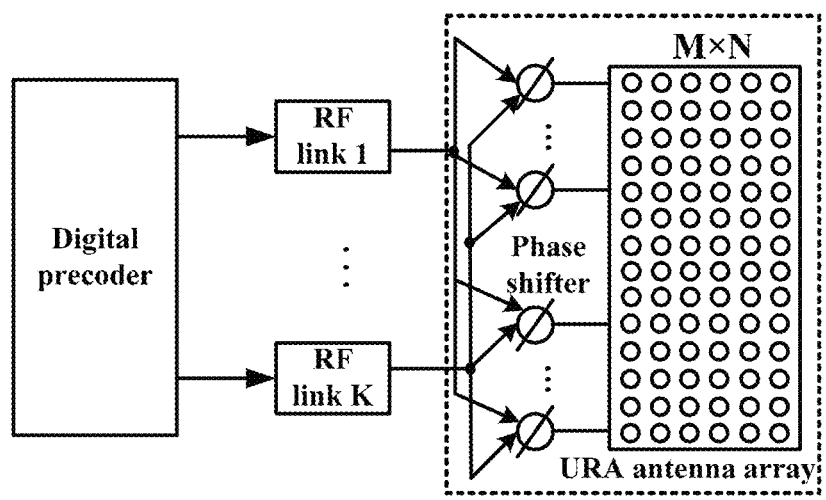
FIG. 1 shows an example of a digital-analog hybrid beamforming antenna structure.

In the digital-analog hybrid beamforming structure, digital beamforming and analog beamforming are used in combination. FIG. 1 shows an example of a digital-analog hybrid beamforming antenna structure, in which an M×N Uniform Rectangular Array (URA) is employed, and the number of RF links, which is indicated by K, is less than the size of the antenna array, which is indicated by M×N.

Figure 2:
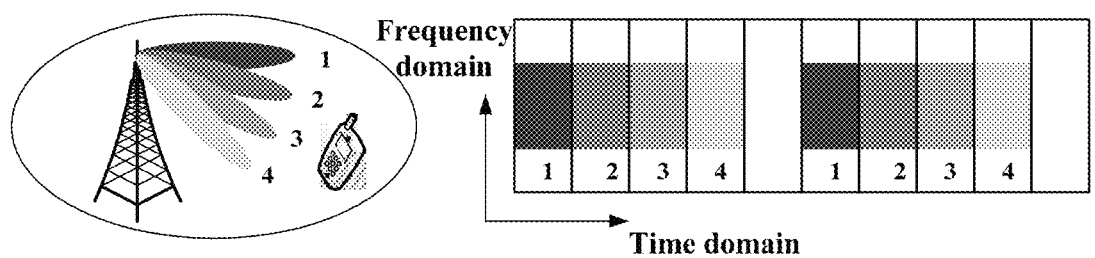
FIG. 2 shows a beam scanning scheme for downlink in the prior art.
Figure 3:
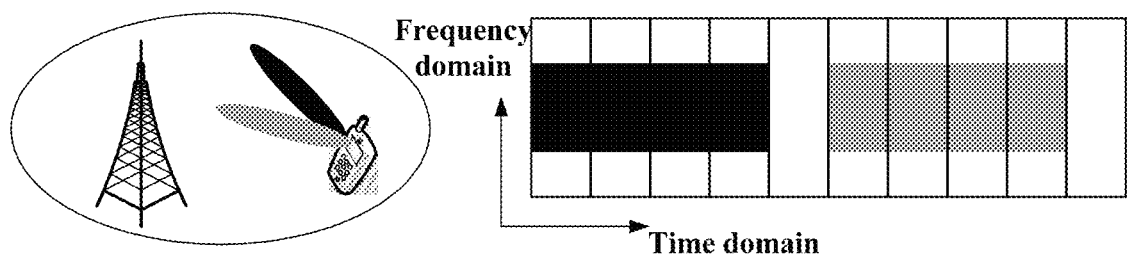
FIG. 3 shows a beam scanning scheme for uplink in the prior art.

Due to inflexible angles in the analog beamforming, a beam scanning technology based on multi-beam is commonly used to determine an optimal beam pair for initial access. FIG. 2 shows a beam scanning scheme for downlink in the prior art. In a case that the base station transmits signals on the downlink, in order to determine an optimal beam emitting direction, the base station traverses, in one time slot unit, different single narrow beams in an analog domain beam codebook in a time-divisional manner to transmit signals to the user. Then, the base station determines the optimal beam direction by beam measurement and beam information reporting. Similarly, as shown in FIG. 3, the optimal beam determination on the uplink is also implemented by a beam scanning strategy of traversing all beams in a time divisional manner, and all user need to traverse all the beams to obtain their respective optimal beams.

It can be seen that obtaining the optimal beam using the beam scanning strategy in a time-divisional manner requires a high time cost. In addition, in the above method, when the beam link is interrupted or blocked, the beams need to be traversed again, and a sub-optimal beam is obtained by beam scanning, beam measurement, and beam information reporting, which is extremely time-consuming. For example, it is assumed that, the base station end has 8 horizontal beams and 3 vertical beams, which may form 24 analog domain beams, and the user has 5 horizontal beams and 2 vertical beams, which may form 10 analog domain beams. In this case, 240 time slots in total are required to complete scanning of transmitting and receiving beams.

In view of this, it is desirable to provide a technology capable of quickly determining an optimal beam pair. It should be understood that although the above description is given with the millimeter wave communications as an application background, the technology provided in the present disclosure is not limited thereto, and may be applied to other wave bands such as a microwave band or a band having a wavelength shorter than a wavelength of a millimeter wave. More generally, the technology provided in the present disclosure may be suitably applied to any wireless communication scenario in which it is required to determine the optimal beam pair. Further, the technology of the present disclosure may be suitably applied to various antenna structures having beamforming capabilities.

Figure 4:
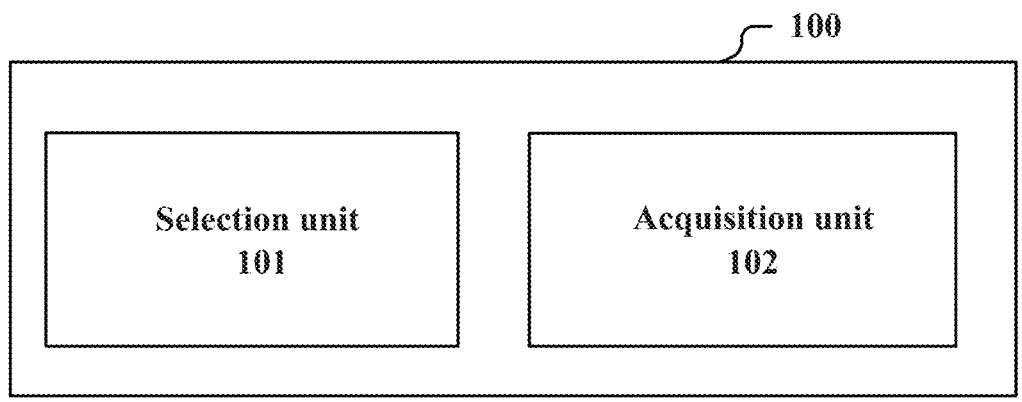
FIG. 4 is a block diagram showing functional modules of an electronic apparatus for wireless communications according to an embodiment of the present disclosure.

FIG. 4 is a block diagram showing functional modules of an electronic apparatus 100 for wireless communications according to an embodiment of the present disclosure. As shown in FIG. 4, the electronic apparatus 100 includes: a selection unit 101 and an acquisition unit 102. The selection unit 101 is configured to: select, based on receiving of a first signal transmitted from a remote wireless communication device, one or more candidate beams from among a predetermined group of beams. The acquisition unit 102 is configured to: acquire, based on the one or more candidate beams, an optimal beam pair which is a beam pair maximizing a channel gain.

The selection unit 101 and the acquisition unit 102 may be implemented, for example, by one or more processing circuitries, which may be implemented, for example, as a chip.

In the present disclosure, the wireless communication device broadly refers to a device implementing a function of wireless communications, such as a transmitter and a receiver for wireless communications. The remote wireless communication device may be, for example, a device that performs wireless communications with a local wireless communication device. For example, the wireless communication device may be a network control terminal or a network node. The network control terminal may be an entity in a communication system for implementing functions such as relevant setting, control, and communication resources allocation for the communication activities, for example, a base station in a cellular communication system, and a baseband cloud device under a Cloud-RAN/Centralized-RAN (C-RAN) architecture (in which a cell may not exist), such as any BBUs that are in high speed communication with each other in a BBU pool under the C-RAN architecture. The network node may be an entity that achieves its communication object by using communication resources in a communication system, for example, various user equipments (such as mobile terminals, smart vehicles, smart wearable devices having a cellular communication capability) or network infrastructures such as a small cell base station.

The wireless communication devices used as a transmitter and a receiver may each have the beamforming capability. It can be understood that, in the case that the beam has directivity, a beam direction of the transmitter is required to match an antenna direction of the receiver to obtain a maximum channel gain. Since the antenna direction of the receiver corresponds to the direction of the beam, the antenna direction of the receiver is also called the beam direction of the receiver. A beam of the transmitter and a beam of the receiver (actually the antenna direction of the receiver) matching best form an optimal beam pair. Compared with other beam pairs, the maximum channel gain can be achieved with the optimal beam pair, and thus the communication quality can be improved using the optimal beam pair.

In this embodiment, the selection unit 101 firstly selects candidate beams to narrow the possible range of the optimal beam pair, improving the determination efficiency of the optimal beam pair, which is different from the conventional manner of adopting beam scanning. Specifically, the selection unit 101 performs selection of candidate beams based on receiving of a first signal from a remote wireless communication device. The first signal may be an omnidirectional signal, that is, a signal whose signal energy is uniformly distributed in all directions, or a directional signal, that is, a signal whose signal energy is focused in a certain direction. By receiving the first signal, it can be roughly determined beams in which direction can be used by the remote wireless communication device to perform communication to obtain a high channel gain, and the beams in these directions are used as candidate beams. The predetermined group of beams is a group of beams respectively corresponding to a predetermined antenna direction, and may be, for example, an analog beam codebook or a part thereof.

The selected candidate beams are then further used to determine the optimal beam pair. Since the number of candidate beams is less than the number of all possible beams, determining the optimal beam pair based only on the candidate beams can speed up the determination and improve the accuracy of the determination. The determination of the optimal beam pair may be performed by the local wireless communication device where the electronic apparatus 100 is located, or by the remote wireless communication device, depending on the actual application and the manner of determining the optimal beam pair.

In the case that the remote wireless communication device determines the optimal beam pair, the acquisition unit 102 acquires information of the optimal beam pair from the remote wireless communication device. In an example, the acquisition unit 102 is configured to generate, with each candidate beam, a second signal to be transmitted to the remote wireless communication device, so that the remote wireless communication device perform determination of the optimal beam pair based on the second signal. For example, the remote wireless communication device determines, for each second signal, a beam with the largest energy corresponding to the second signal, measures a channel gain of a candidate beam pair formed by a beam in the beam codebook whose direction is most close to a direction of the beam with the largest energy and the candidate beam corresponding to the second signal respectively, and selects a candidate beam pair with the largest channel gain as the optimal beam pair.

For example, the selection unit 101 may select the candidate beams as follows: performing Direction Of Arrival (DOA) estimation based on the first signal, to acquire multiple beams; and selecting one or more beams whose directions are most close to the direction of a beam with the largest energy from among the predetermined group of beams, as the candidate beams.

Figure 5:
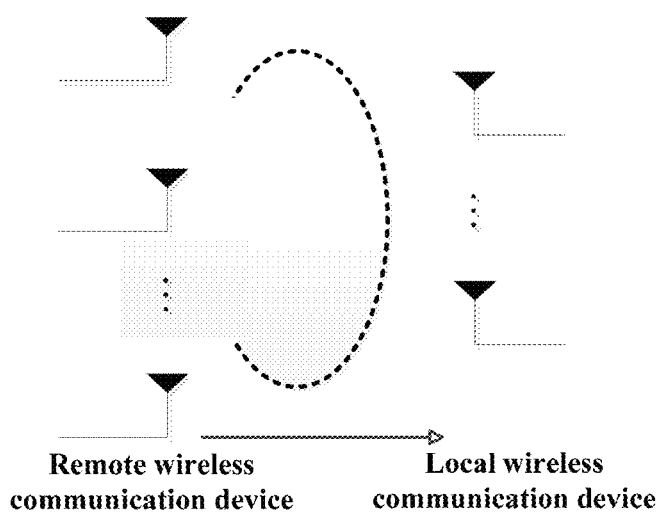
FIG. 5 schematically shows transmission of an omnidirectional signal between wireless communication devices.
Figure 6:
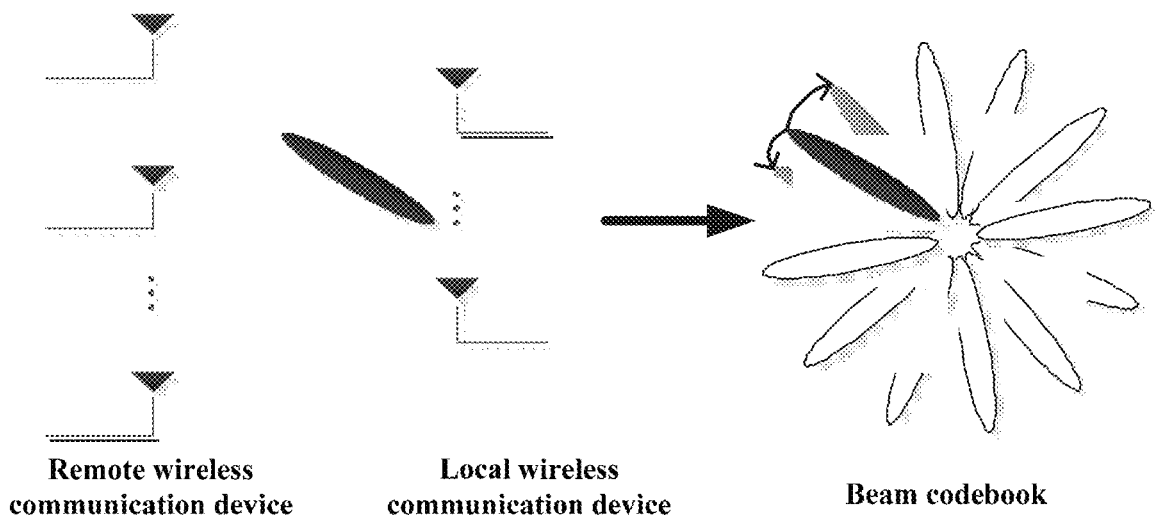
FIG. 6 shows an illustrative example of selecting two candidate beams.
Figure 7:
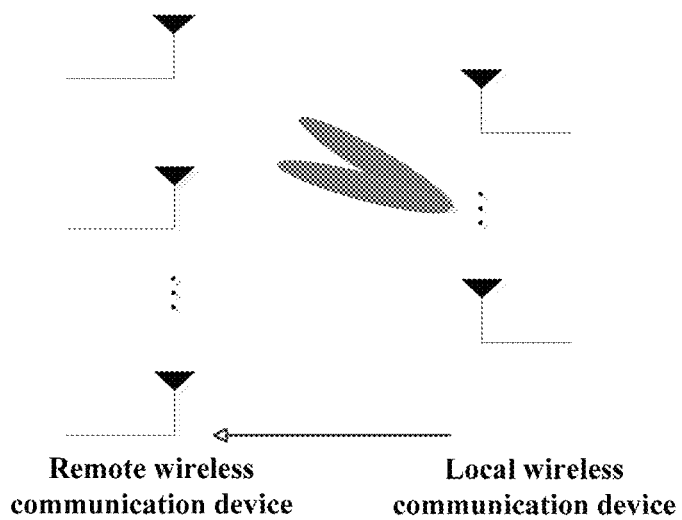
FIG. 7 is a schematic diagram showing transmission of a second signal using the selected candidate beams.

The first signal may be an omnidirectional signal. FIG. 5 schematically shows transmission of an omnidirectional signal between wireless communication devices, in which the remote wireless communication device may be, for example, a base station, and the local wireless communication device may be, for example, user equipment (UE). The selection unit 101 may obtain multiple beams and energy of each beam after performing the DOA estimation, where a direction corresponding to the beam with the largest energy represents a preliminarily estimated direction in which antennas of the transmitter and the receiver match. However, since the beam in this direction may be not included in the predetermined group of beams, P beams whose directions are close to the direction may be selected from among the predetermined group of beams such as the analog beam codebook, as the candidate beams. P may be 1 or more, for example, P may be 2. FIG. 6 shows an illustrative example of selecting two candidate beams, where a black beam represents a beam with the largest energy, and two gray beams represent selected candidate beams. FIG. 7 is a schematic diagram showing transmission of a second signal using the selected candidate beams. It should be noted that although two candidate beams are shown here, the candidate beams are sequentially transmitted rather than simultaneously in the case that there are multiple candidate beams.

The time cost for the determination of the optimal beam is increased with the increase of P. This is because that, after receiving the second signal, the remote wireless communication device performs selection of candidate beams (referred to as second candidate beams, for example, each candidate beam corresponds to Q second candidate beams) on the remote wireless communication device side based on the second signal. A candidate beam pair is formed by the candidate beam corresponding to the second signal and the selected second candidate beam. Time-divisional measurement is performed on all candidate beam pairs to obtain the channel gain, and the candidate beam pair with the maximum channel gain is selected as the optimal beam pair. In the case that each candidate beam corresponds to Q second candidate beams, the number of candidate beam pairs is P×Q. Therefore, the larger the number of candidate beams and/or second candidate beams is, the larger the number of candidate beam pairs is, and the more the time would be spent.

Figure 8:
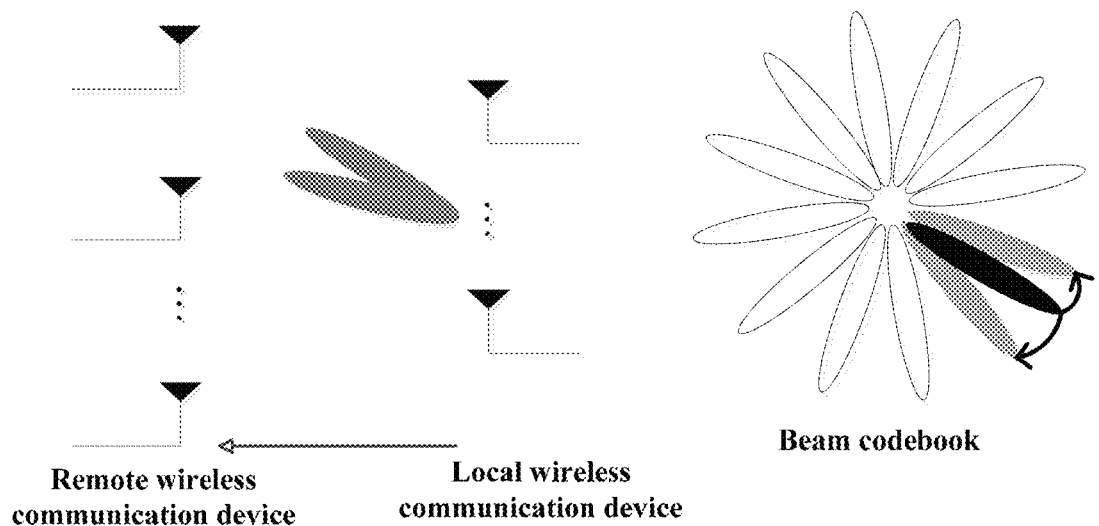
FIG. 8 is a schematic diagram showing a remote wireless communication device performing selection of a second candidate beam.

FIG. 8 is a schematic diagram showing a remote wireless communication device performing selection of second candidate beams. Similarly, a black beam represents a beam with the largest energy, which is mapped into a beam codebook to obtain a candidate beam, and a gray beam represents a selected second candidate beam. For example, the remote wireless communication device may similarly obtain multiple beam directions corresponding to the second signal transmitted by the local wireless communication device by performing the DOA estimation, obtain a DOA-estimated beam with the largest energy, and select, from among the beam codebook, beams whose directions are most close to the direction of the DOA-estimated beam as the second candidate beams.

Figure 9:
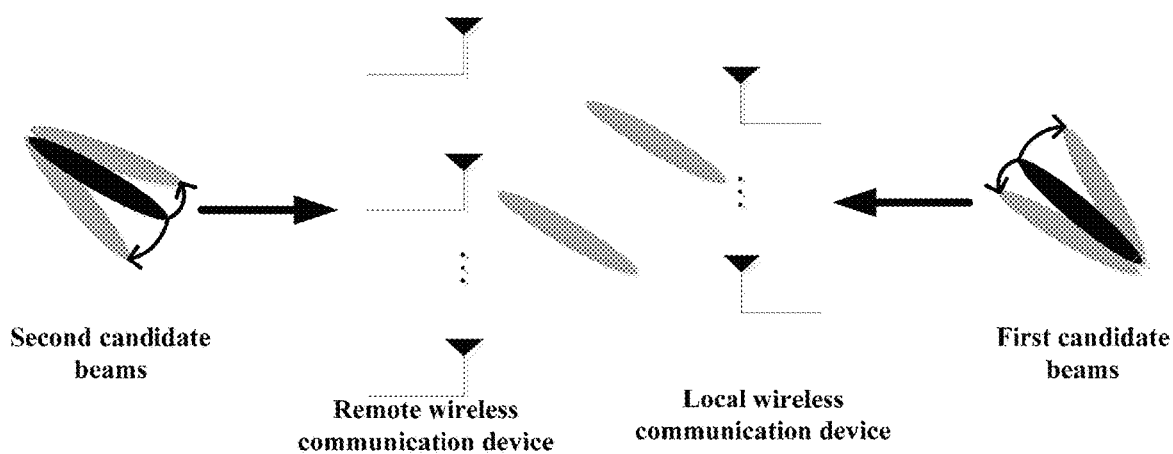
FIG. 9 is a schematic diagram showing a remote wireless communication device performing time-divisional measurement on candidate beam pairs to determine an optimal beam pair.

FIG. 9 is a schematic diagram showing a remote wireless communication device performing time-divisional measurement on candidate beam pairs to determine an optimal beam pair. Specifically, the local wireless communication device transmits each of the candidate beams in a time-divisional manner, and the remote wireless communication device receives the candidate beam in the antenna direction of the corresponding second candidate beams, and obtains the channel gain of the candidate beam pair by performing the measurement. After all measurements are completed, the candidate beam pair with the highest channel gain is selected as the optimal beam pair.

Figure 10:
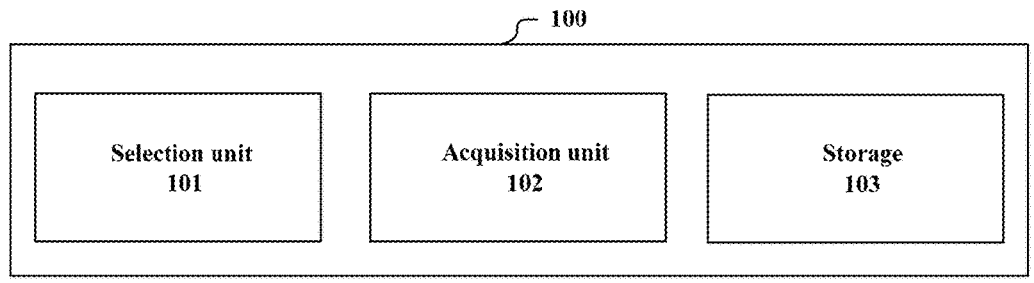
FIG. 10 is a block diagram showing functional modules of an electronic apparatus for wireless communications according to an embodiment of the present disclosure.

Furthermore, as shown in FIG. 10, the electronic apparatus 100 may further include: a storage 103, configured to store the result of the above mentioned DOA estimation, For example, the storage 103 may store the obtained directions of the beams in a descending order of energy, or store the direction of each beam in association with the energy of the beam. In addition, the storage 103 may also store measurement results for all candidate beam pairs. For example, the storage 103 may store the candidate beam pairs in an ascending order of the channel gain, or store each candidate beam pair in association with a corresponding channel gain. These results may be used, for example, as reference to beam switching when problems such as beam quality degradation or beam link interruption or blocking occur in subsequent communications.

Figure 11:
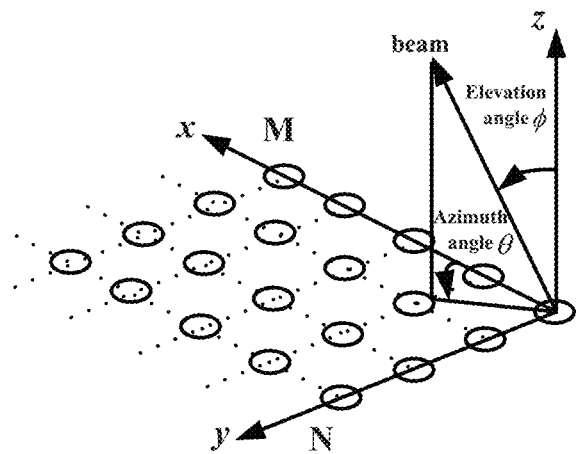
FIG. 11 is a schematic diagram showing an azimuth angle and an elevation angle.

In an example, the selection unit 101 may perform three-dimensional DOA estimation to obtain the direction of the beam. In the three-dimensional DOA estimation, for example, an azimuth angle and an elevation angle of the beam may be determined so as to determine the direction of the beam. FIG. 11 is a schematic diagram showing an azimuth angle and an elevation angle. An effective three-dimensional DOA estimation method suitable for a digital-analog hybrid antenna structure is further provided in this embodiment.

Specifically, the selection unit 101 is configured to: select multiple continuous antenna units in one dimension of an antenna array to connect to radio frequency links in order to configure an antenna structure, and apply a direction of arrival estimation algorithm to the first signal received through the antenna structure to acquire an azimuth angle of a beam; and select multiple continuous antenna units in another dimension of the antenna array to connect to the radio frequency links in order to configure an antenna structure, and apply a direction of arrival estimation algorithm to the first signal received through the antenna structure to acquire an elevation angle of a beam.

The following description is given taking the antenna structure including the M×N antenna array shown in FIG. 1 as an example. In a first time slot, the selection unit 101 selects K continuous antennas in any one row of the antenna array to form a uniform linear array (ULA). The ULA is connected to K RF links, and an azimuth angle θ is estimated with the DOA algorithm. In a second time slot, the acquisition unit 102 selects K continuous antennas in any one column of the M×N antenna array to form a ULA. The ULA is connected to K RF links, and an estimated elevation angle φ is obtained using the DOA algorithm. The direction of arrival estimation may be performed using at least one of the following DOA algorithms: an MUSIC algorithm, an ESPRIT algorithm, and a Capon algorithm. In this embodiment, the accuracy of the three-dimensional DOA estimation algorithm can achieve the highest accuracy of the DOA estimation algorithm of the existing uniform linear array, and the angle estimation for the azimuth and elevation angles is flexible and simple. However, it should be understood that the determination unit 102 may also employ other three-dimensional DOA estimation algorithm or a two-dimensional DOA estimation algorithm, which is not limiting herein.

Generally, the local wireless communication device performs communication utilizing the optimal beam pair. If quality degradation of the optimal beam pair, beam link interruption or blocking occurs in the communication, both the communication parties may discard the beam pair with the degraded quality and perform beam switching.

Figure 12:
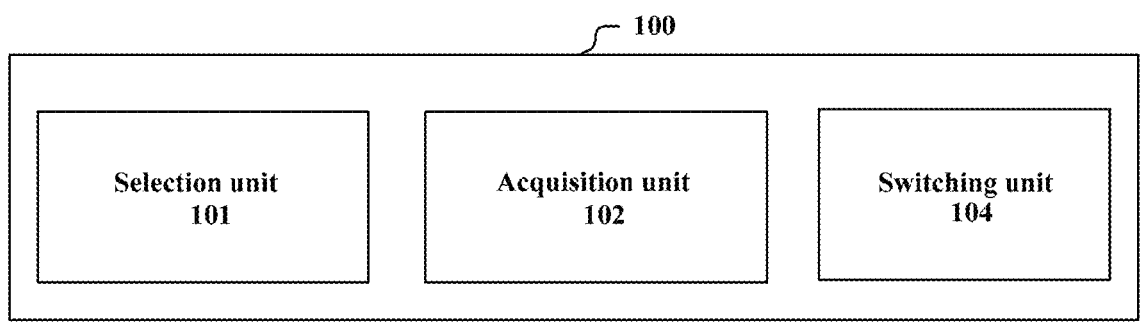
FIG. 12 is a block diagram showing functional modules of an electronic apparatus for wireless communications according to an embodiment of the present disclosure.

As shown in FIG. 12, the electronic apparatus 100 may further include: a switching unit 104, configured to switch the communication to a sub-optimal beam pair in the case that a communication quality decreases to be below a predetermined degree. Further, although not shown in FIG. 12, the storage 103 can be also included in FIG. 12.

The sub-optimal beam pair may be a beam pair with the largest channel gain among the candidate beam pairs determined by the remote communication device based on the second signal other than the optimal beam pair. In this case, the switching can be very fast, and no additional measurement or calculation is required.

In another example, the selection unit 101 selects, from among the predetermined group of beams, one or more beams whose directions are most close to the direction of a beam with the second largest energy as sub-optimal candidate beams, and generates the second signal using the sub-optimal candidate beams so that the remote wireless communication device performs determination of the sub-optimal beam pair. In other words, with respect to the beam with the second largest energy, the selection of candidate beams and the transmitting of second signal are performed, and the remote communication device repeats the process of selecting the optimal beam pair for the second signal. However, the determined optimal beam pair determined at this time is actually a sub-optimal beam pair for both the transmitter and the receiver.

For example, the selection unit 101 may perform beam selection with reference to information stored in the storage 103. Information about the beam and corresponding energy may also be obtained from the remote wireless communication device.

Further, although not shown in the drawings, the electronic apparatus 100 provided in the present disclosure may further include a communication unit configured to communicate with the remote wireless communication device to exchange various information. The communication unit herein may include the antenna structure described above and associated hardware circuitry and/or software programs. The communication unit, performs, for example, at least one of the following: reception of a first signal, transmission of a second signal, reception of a DOA estimation result, reception of a measurement result for a candidate beam pair, and the like.

In summary, with the electronic apparatus 100 according to the present embodiment of the present disclosure, the beam scanning range is narrowed by performing candidate beam selection, so that the optimal beam pair can be determined efficiently, quickly, and accurately, and the beam switching can be quickly performed in the case that beam quality degradation or beam link interruption or blocking occurs, thereby achieving a fast, accurate, robust, and flexible beam management scheme.

Second Embodiment

In this embodiment, a predetermined group of beams is, for example, a part of a beam codebook. Beam codebooks of the local wireless communication device and the remote wireless communication device may be grouped. The selection unit 101 performs the selection based on the grouping when selecting the candidate beams.

For example, the selection unit 101 may perform selection of the candidate beams based on reference signal receiving power (RSRP) of the received first signal, and the acquisition unit 102 performs determination of an optimal beam pair based on the RSRP.

Specifically, the remote wireless communication device transmits a first signal to the local wireless communication device, where the first signal is transmitted using a beam in each of S groups of beams of the remote wireless communication device. That is, the first signal is transmitted for S times. Further, the local wireless communication device receives the first signal using a beam in each of L groups of beams of the local wireless communication device. That is, each transmitted beam is received for L times. In this case, these beams constitute S×L beam pairs, which require to occupy S×L time slots in total.

The selection unit 101 selects possible candidate beams based on RSRP from among a group formed by L beams respectively from the L groups of beams. The candidate beams refer to beams corresponding to the antenna direction in which the local wireless communication device performs receiving. For example, a beam corresponding to the antenna direction with the largest RSRP of the received first signal is selected as a candidate beam, and the beam forms a candidate beam pair with a beam corresponding to the transmission direction with the largest RSRP of the first signal. The acquisition unit 102 determines, based on the RSRP result of the candidate beam pair, whether the communication requirement is met. If the communication requirement is met, the candidate beam pair is determined as the optimal beam pair. Otherwise, the groups of beams of the remote wireless communication device and the groups of beams of the local wireless communication device corresponding to the candidate beam pair respectively are further divided to repeatedly search for the optimal beam pair that can meet the communication requirement in the divided subgroup.

That is, the selection unit 102 selects a beam pair having the largest RSRP as a candidate beam pair, where the candidate beam pair includes a candidate beam and a beam corresponding to the first signal. The acquisition unit 102 determines the candidate beam pair as the optimal beam pair in the case that the candidate beam pair meets the communication requirement.

As an example, the beam corresponding to the first signal is selected from among beams each located in the middle position of each pre-divided group of beams at the remote wireless communication device side, and the candidate beam is selected from among beams each located in the middle position of each pre-divided group of beams at the present wireless communication device side.

For ease of understanding, a specific example is given below with a base station and a UE as application scenarios. It is assumed that the base station has 24 analog domain beams, and the user has 10 analog domain beams. Firstly, the beams of the base station are divided into four groups (Z1, Z2, Z3, Z4) according to the beam information, where the beams with angles close to each other form a group. Similarly, the beams of the user are divided into 2 groups (U1, U2). Then, the base station selects a beam having an intermediate value in each group to transmit the reference signal to the user, which requires 4 time slots. The user performs receiving using the beam having a value closest to the intermediate value in each of the two groups, which requires 2 time slots. Thus, 4×2 beam pairs are formed, and it is required to occupy 4×2 time slots. An optimal pair (for example, (Z2, U1)) is obtained as a candidate beam pair according to the sorting of the RSRP information, and the measurement result is recorded. Then, whether the candidate beam pair meets the communication requirement is determined according to the RSRP result. If it is determined that the candidate beam pair meets the communication requirement, the above process is stopped, and the candidate beam pair is used as the optimal beam pair for communication, otherwise the following process is performed.

There are 6 beams in the Z2 group of the base station, which are evenly divided into two beam subgroups (Z21, Z22). The most intermediate beam is selected from each beam subgroup to be used for transmitting the reference signal to the user. The beams in the U1 group of the user are also divided into two groups (U11, U12). The most intermediate beam in each of the two groups is used for the receiving. In this case, 2×2 beam pairs are formed, which requires to occupy 2×2 time slots. Then, the candidate beam pair is obtained according to the sorting of the RSRP information, and whether the communication requirement is met is determined until an optimal beam pair meeting the communication requirement is found.

In this example, the local wireless communication device (e.g., a UE) performs communication using the obtained optimal beam pair, and the electronic apparatus 100 may further include a switching unit 104, configured to switch the communication to a sub-optimal beam pair in the case that the communication quality decreases to be below a predetermined degree. The sub-optimal beam pair is a candidate beam pair with the largest RSRP among the candidate beam pairs other than the optimal beam pair. For example, the electronic apparatus 100 may further include a storage 103 configured to store candidate beam pairs and corresponding RSRP information.

In this way, when the beam quality is degraded, or the link is interrupted or blocked during communication, the recorded RSRP information and the corresponding beam information can be quickly searched for fast switching. In addition, although the beam pair with the largest RSRP in each search is used as the candidate beam pair, it is not limited thereto. For example, a beam pair whose RSRP exceeds a certain level may be used as a candidate beam pair, and the acquisition unit 102 determines the optimal beam pair according to the RSRPs of the candidate beam pairs and whether the communication requirement is met. In this case, the storage 103 may store more information about the candidate beam pairs, which is advantageous for achieving more accurate switching.

The grouping shown in the above example is only exemplary, which may be flexibly set as needed in practice. Compared with the conventional beam scanning, the time cost can be significantly reduced with the method of determining the optimal beam pair in this embodiment.

Correspondingly, an electronic apparatus for wireless communications is further provided according to an embodiment of the present disclosure. The electronic apparatus includes a generation unit, configured to generate a first signal according to predetermined beam grouping. The first signal is used by the remote wireless communication device to determine the optimal beam pair based on a reference signal receiving power of the first signal. The generation unit may be implemented, for example, by one or more processing circuitries, which can be implemented, for example, as a chip.

As mentioned above, the predetermined beam grouping may be flexibly set as needed.

In summary, with the electronic apparatus according to the embodiment, the beam codebook is grouped in advance, and the optimal beam pair is determined based on the RSRP, so that the time cost can be effectively reduced, thereby achieving a fast, accurate, robust and a flexible beam management scheme.

Third Embodiment

Figure 13:
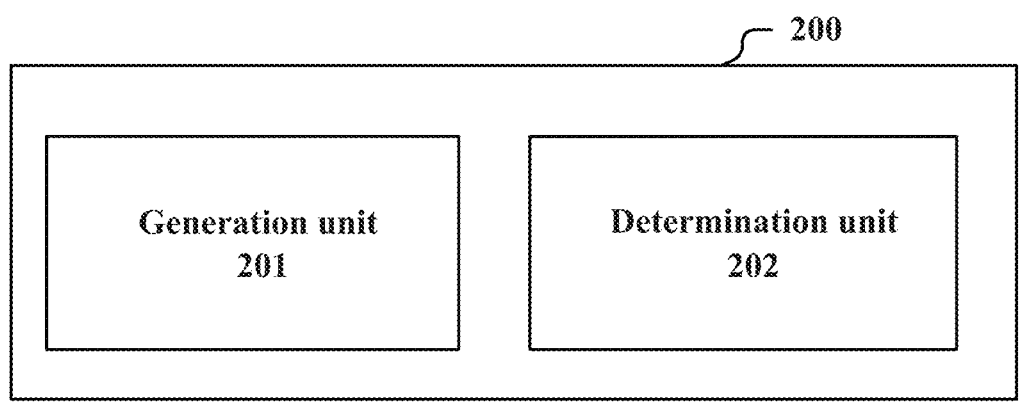
FIG. 13 is a block diagram showing functional modules of an electronic apparatus for wireless communications according to another embodiment of the present disclosure.

FIG. 13 is a block diagram showing functional modules of an electronic apparatus 200 for wireless communications according to another embodiment of the present disclosure. As shown in FIG. 13, the electronic apparatus 200 includes: a generation unit 201 and a determination unit 202. The generation unit 201 is configured to generate a first signal to be transmitted to a remote wireless communication device. The determination unit 202 is configured to: select, based on a second signal transmitted by the remote wireless communication device using each of one or more candidate beams selected based on the first signal, one or more second candidate beams from among a predetermined group of beams, to determine an optimal beam pair. The optimal beam pair includes one of the candidate beams and one of the second candidate beams.

The generation unit 201 and the determination unit 202 may be implemented, for example, by one or more processing circuitries, which can be implemented, for example, as a chip.

For example, the first signal may be an omnidirectional signal. The remote wireless communication device obtains one or more candidate beams based on the receiving of the first signal, where the candidate beams are substantially located near a beam with the largest energy received by the remote wireless communication device. The remote wireless communication device then transmits a second signal using each of the candidate beams respectively. The determination unit 202 obtains a direction of the beam with the largest energy after receiving the second signal, and selects beams whose directions are close to the direction of beam from among the predetermined group of beams, as the second candidate beams. The above process has been described in the first embodiment with reference to FIGS. 5 to 8, and the details thereof are not repeated herein.

In an example, the determination unit 202 is configured to: perform DOA estimation based on the second signal to acquire a beam with the largest energy, and select, from among the predetermined group of beams, one or more beams whose directions are most close to the direction of the beam with the largest energy as the second candidate beams; and perform beam measurement on candidate beam pairs each formed by each of the candidate beams and one of the second candidate beams corresponding to the candidate beam, and select a candidate beam pair with the largest measured channel gain as the optimal beam pair.

The determination unit 202 may perform three-dimensional DOA estimation. Specifically, the determination unit 202 is configured to: select multiple continuous antenna units in one dimension of an antenna array to connect to radio frequency links to configure an antenna structure, and apply a direction of arrival estimation algorithm to the second signal received through the antenna structure to acquire an azimuth angle of a beam; and select multiple continuous antenna units in another dimension of the antenna array to connect to the radio frequency links to configure an antenna structure, and apply a direction of arrival estimation algorithm to the second signal received through the antenna structure to acquire an elevation angle of a beam.

For example, at least one of the following direction of arrival estimation algorithms may be used: an MUSIC algorithm, an ESPRIT algorithm, and a Capon algorithm.

A detailed description of the three-dimensional DOA estimation algorithm may refer to the description of the first embodiment, which is not repeated herein. It should be understood that the determination unit 202 may also employ other three-dimensional DOA estimation algorithm or a two-dimensional DOA estimation algorithm, which is not limiting herein.

The following description is given by a specific example. In this specific example, the wireless communication device where the electronic apparatus 200 is located is a base station, and the remote wireless device is user equipment UE served by the base station. After the base station transmits the first signal, the UE obtains P candidate beams by three-dimensional DOA estimation, and then transmits the second signal using each candidate beam in a time-divisional manner and reports the beam information. The base station performs DOA estimation upon receiving the second signal. If Q second candidate beams closest to the beam with the largest energy are selected for each second signal, P×Q candidate beam pairs are formed. An example is shown in the following table, where the UE has P=2 candidate beams, which are respectively indicated by p1 and p2, the base station has 2 candidate beams (q11, q12) for p1, and the base station has 1 candidate beam q21 for p2. There are three candidate beam pairs, as shown by G1 to G3 in the table below.

| Candidate beam pairs | Second candidate beam 1 at base station side | Second candidate beam 2 at base station side |
| --- | --- | --- |
| Candidate beam p1 at UE side | G1(p1, q11) | G2(p1, q12) |
| Candidate beam p2 at UE side | G3(p2, q21) | None |

For example, in a first time slot, the UE transmits the second signal using the candidate beam p1 and reports the beam angle information. The base station performs receiving using q11 (in the antenna direction corresponding to q11), and the base station obtains a channel gain A of a first candidate beam pair G1 according to the beam measurement.

In a second time slot, the UE still transmits the second signal using the candidate beam p1 and reports the beam angle information. The base station performs receiving using q12 (in the antenna direction corresponding to q12), and the base station obtains a channel gain B of a second candidate beam pair G2 according to the beam measurement.

In a third time slot, the UE transmits the second signal using the candidate beam p2 and reports the beam angle information. The base station performs receiving using q21 (in the antenna direction corresponding to q21), and the base station obtains a channel gain C of a third candidate beam pair G3 according to the beam measurement.

The determination unit 102 compares the channel gains A, B, and C with each other. If B>A>C, it is indicated that the maximum channel gain may be obtained using the beam pair G2, then G2(p1, q12) is selected as the optimal beam pair.

Figure 14:
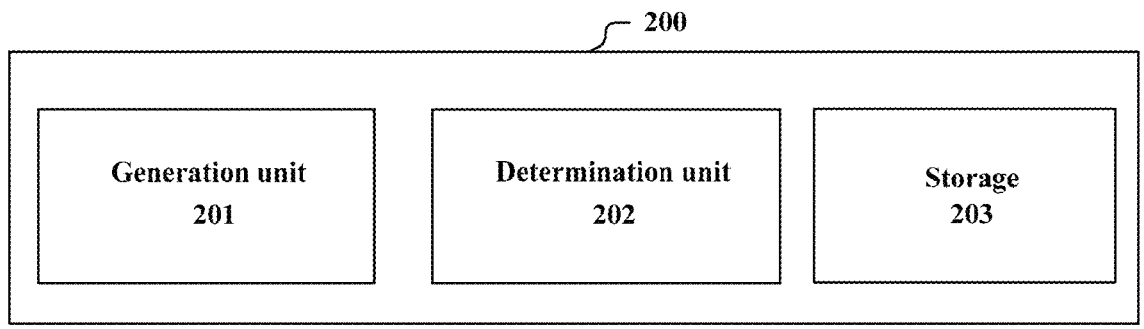
FIG. 14 is a block diagram showing functional modules of an electronic apparatus for wireless communications according to another embodiment of the present disclosure.

Further, as shown in FIG. 14, the electronic apparatus 200 may further include a storage 203 configured to store a result of the beam measurement. For example, the storage may store candidate beam pairs and corresponding channel gains. In the above example, the storage may store the following information: (G1, A), (G2, B), and (G3, C). The information may be used for beam switching in the case of beam quality degradation, link interruption or blocking during the communication.

Figure 15:
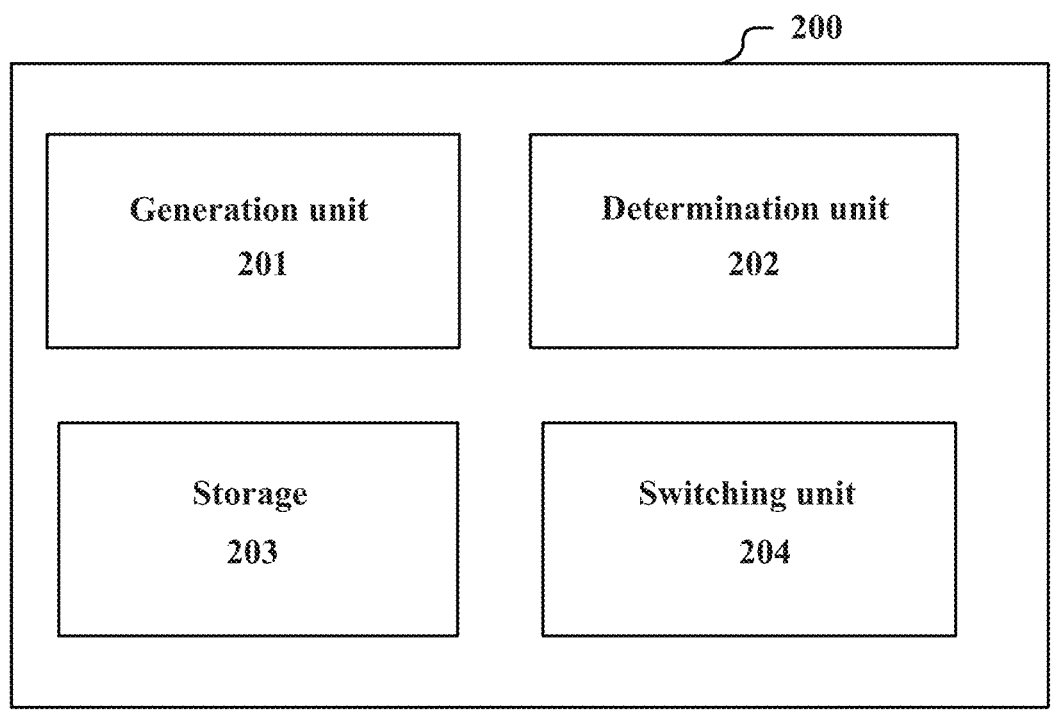
FIG. 15 is a block diagram showing functional modules of an electronic apparatus for wireless communications according to another embodiment of the present disclosure.

As shown in FIG. 15, the electronic apparatus 200 may further include a switching unit 204. Generally, the wireless communication device performs communication using an optimal beam pair when initially accessing, and the switching unit 204 is configured to switch the communication to a sub-optimal beam pair in the case that a communication quality decreases to be below a predetermined degree.

For example, the sub-optimal beam pair is a beam pair with the largest channel gain among the candidate beam pairs other than the optimal beam pair. In the above example, the sub-optimal beam pair may be G1.

In addition, the sub-optimal beam pair may also be determined as follows. The determination unit 202 selects, based on a third signal transmitted by the remote wireless communication device using each of one or more sub-optimal candidate beams selected based on the first signal, one or more third candidate beams from among the predetermined group of beams, to determine a sub-optimal beam pair which includes one of the sub-optimal candidate beams and one of the third candidate beams.

In other words, when beam switching is to be performed, the remote wireless communication device selects a beam with the second largest energy from among the multiple beams obtained based on the first signal, and selects, from among the predetermined group of beams, one or more beams closest to the beam with the second largest energy as sub-optimal candidate beams. The remote wireless communication device then transmits a third signal to the local wireless communication device using each of the sub-optimal candidate beams in sequence. The local wireless communication device performs DOA estimation on the received third signal to obtain a beam with the largest energy, and selects, from among the predetermined group of beams, one or more beams whose directions are most close to the direction of the beam with the largest energy as third candidate beams. Each sub-optimal candidate beam and the third candidate beam corresponding to sub-optimal candidate beam form a candidate beam pair. The local wireless communication device performs channel gain measurement for each candidate beam pair. The candidate beam pair with the largest channel gain is used as the sub-optimal beam pair, and the communication is switched to the sub-optimal beam pair.

As described above, when initially accessing, in the case of P candidate beams and Q second candidate beams for each candidate beam, the determination of the optimal beam pair in the present disclosure requires (1+P) times of DOA estimation and (P×Q) times of beam measurement, which is far less than that in the conventional beam scanning method. Moreover, the cost at the time of switching is small, for example, only a lookup table is required, or only (P−1) times of DOA estimation and ((P−1)×Q) times of beam measurement are required. Therefore, a fast, accurate, robust and flexible beam management scheme can be implemented.

Further, although not shown in the drawings, the electronic apparatus 200 may further include a communication unit configured to communicate with the remote wireless communication device to exchange various information. The communication unit herein may include the antenna structure described above and associated hardware circuitry and/or software programs. The communication unit performs, for example, at least one of the following: transmission of a first signal, reception of a second signal, reception of a DOA estimation result, transmission of a measurement result for a candidate beam pair, and the like.

Figure 16:
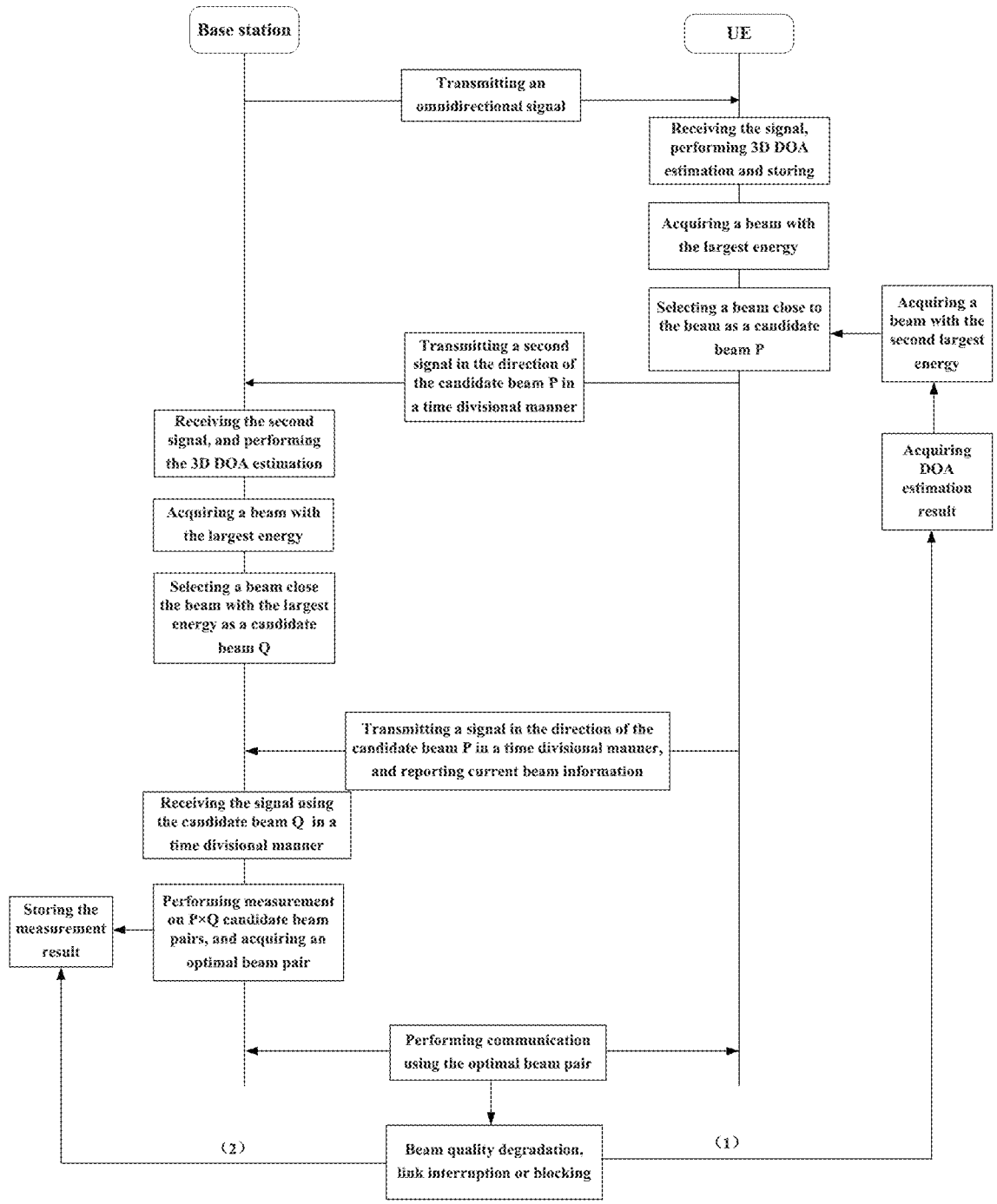
FIG. 16 is a schematic diagram showing an information procedure of a beam management scheme according to an embodiment of the present disclosure.

For ease of understanding, FIG. 16 shows a schematic diagram of an information procedure of the above-described beam management scheme according to the present disclosure. In FIG. 16, the illustration is given by a base station and user equipment as examples, but it should be understood that the body of the information interaction is not limited thereto, and the beam management scheme may be applied to any wireless communication transmitter and receiver having beamforming capabilities.

This information procedure is briefly described below with reference to FIG. 16. Firstly, the base station transmits an omnidirectional signal to the user equipment UE, and the UE receives the signal and performs three-dimensional DOA estimation to obtain multiple beams, for example, by employing the method in the foregoing embodiment or any other method used for three-dimensional DOA estimation. Then, the UE obtains a beam with the largest energy and stores a result of the DOA estimation, such as a correspondence between each beam and the energy thereof in a storage. The UE selects beams closest to the beam with the largest energy in a beam codebook as candidate beams P, and transmits a second signal having the direction of each candidate beam P to the base station in a time-divisional manner. After receiving the second signal, the base station performs three-dimensional DOA estimation and obtains the beam with the largest energy, and selects beams closest to the beam with the largest energy in the beam codebook as candidate beams Q, where each candidate beam P and each candidate beam Q form a candidate beam pair. Next, the selected candidate beam pairs are measured. Specifically, the UE transmits a signal in the direction of the candidate beam P in a time divisional manner and reports the beam information. The base station receives the signal using the candidate beam Q in a time divisional manner. The P×Q candidate beam pairs are each measured, and the candidate beam pair with the largest channel gain is used as the optimal beam pair. In addition, the measurement result for the candidate beam pairs may also be stored.

Subsequently, the base station and the user equipment communicate with each other using the optimal beam pair. If beam quality degradation, link interruption or blocking occurs during communication, the beam switching may be performed in one of two beam switching manners, which are respectively shown as (1) and (2). In the manner (1), the UE obtains a beam with the second largest energy with reference to the stored DOA estimation result, and repeatedly performs the selection of the candidate beam P, the candidate beam Q, and the determination of the optimal beam pair. In this case, the determined optimal beam pair is in fact a sub-optimal beam pair. In the manner (2), the base station selects a sub-optimal beam pair with reference to the stored measurement result for the candidate beam pairs to perform communication.

It should be understood that the information procedure is merely exemplary, and each step therein may be modified, omitted, or added as appropriate.

Fourth Embodiment

In the process of describing the electronic apparatus in the embodiments described above, obviously, some processing and methods are also disclosed. Hereinafter, an overview of the methods is given without repeating some details disclosed above. However, it should be noted that, although the methods are disclosed in a process of describing the electronic apparatus, the methods do not certainly employ or are not certainly executed by the aforementioned components. For example, the embodiments of the electronic apparatus may be partially or completely implemented with hardware and/or firmware, the method described below may be executed by a computer-executable program completely, although the hardware and/or firmware of the electronic apparatus can also be used in the methods.

Figure 17:
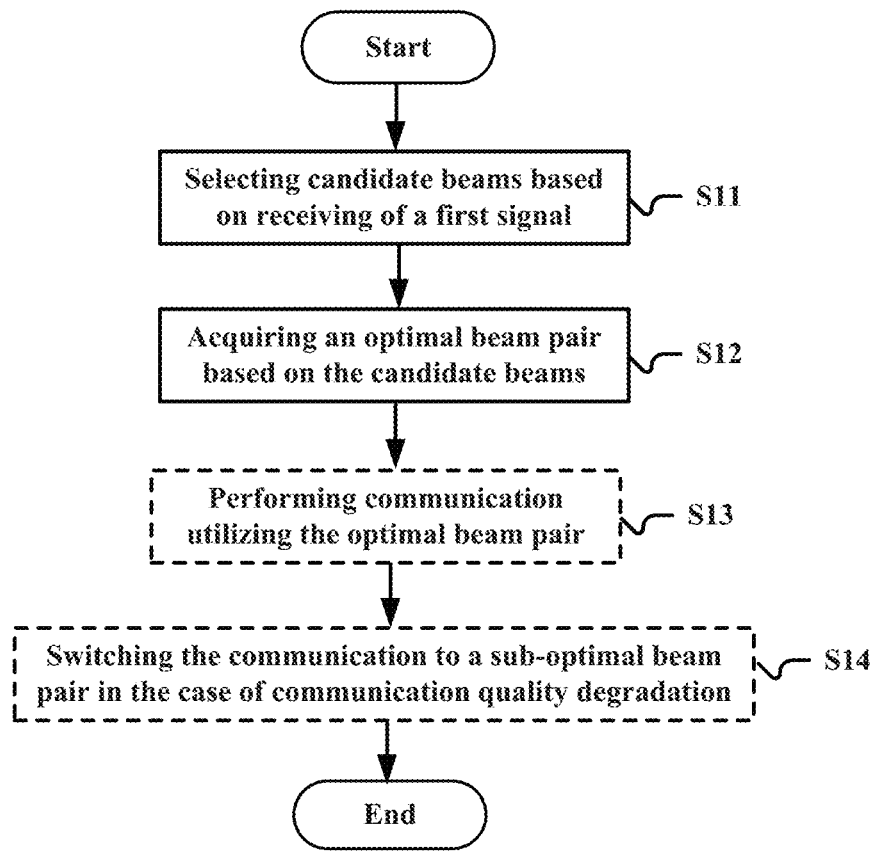
FIG. 17 is a flowchart showing a method for wireless communications according to an embodiment of the present disclosure.

FIG. 17 is a flowchart showing a method for wireless communications according to an embodiment of the present disclosure. The method includes: selecting, based on receiving of a first signal transmitted from a remote wireless communication device, one or more candidate beams from among a predetermined group of beams (S11); and acquiring, based on the one or more candidate beams, an optimal beam pair which is a beam pair maximizing a channel gain (S12).

In an example, in step S11, direction of arrival estimation is performed based on the first signal to acquire multiple beams, and one or more beams whose directions are most close to the direction of a beam with the largest energy is selected from among the predetermined group of beams, as the candidate beams. Moreover, although not shown in the FIG. 17, the above method may further include the step of storing a result of the direction of arrival estimation.

In step S12, a second signal to be transmitted to the remote wireless communication device is generated with each candidate beam, so that the remote wireless communication device performs determination of the optimal beam pair based on the second signal.

For example, the direction of arrival estimation may be performed in step S11 as follows: selecting multiple continuous antenna units in one dimension of an antenna array to connect to radio frequency links in order to configure an antenna structure, and applying a direction of arrival estimation algorithm to the first signal received through the antenna structure to acquire an azimuth angle of a beam; and selecting multiple continuous antenna units in another dimension of the antenna array to connect to the radio frequency links in order to configure an antenna structure, and applying a direction of arrival estimation algorithm to the first signal received through the antenna structure to acquire an elevation angle of a beam. At least one of the following direction of arrival estimation algorithms may be used: an MUSIC algorithm, an ESPRIT algorithm, and a Capon algorithm.

Further, as shown by the dashed line blocks in FIG. 17, the above method further includes: performing communication utilizing the optimal beam pair (S13); and switching the communication to a sub-optimal beam pair in the case that a communication quality decreases to be below a predetermined degree (S14).

For example, the sub-optimal beam pair is a beam pair with the largest channel gain among the candidate beam pairs determined by the remote wireless communication device based on the second signal other than the optimal beam pair.

In addition, the sub-optimal beam pair may also be determined as follows: selecting, from among the predetermined group of beams, one or more beams whose directions are most close to the direction of a beam with the second largest energy as sub-optimal candidate beams; and generating the second signal using the sub-optimal candidate beams so that the remote wireless communication device perform determination of the sub-optimal beam pair.

In another example, in steps S11 and S12, selecting of the candidate beams and determination of the optimal beam pair are performed based on a reference signal receiving power of the received first signal.

For example, a beam pair with the largest reference signal receiving power may be selected as the candidate beam pair, where the candidate beam pair includes a candidate beam and a beam corresponding to the first signal. In this case, the communication is switched to a sub-optimal beam pair in the case that a communication quality decreases to be below a predetermined degree. The sub-optimal beam pair is a candidate beam pair with the largest reference signal receiving power among the candidate beam pairs other than the optimal beam external.

Exemplarily, the beam corresponding to the first signal is selected from among beams each located in the middle position of each pre-divided group of beams at the remote wireless communication device side, and the candidate beam is selected from among beams each located in the middle position of each pre-divided group of beams at the present wireless communication device side.

Figure 18:
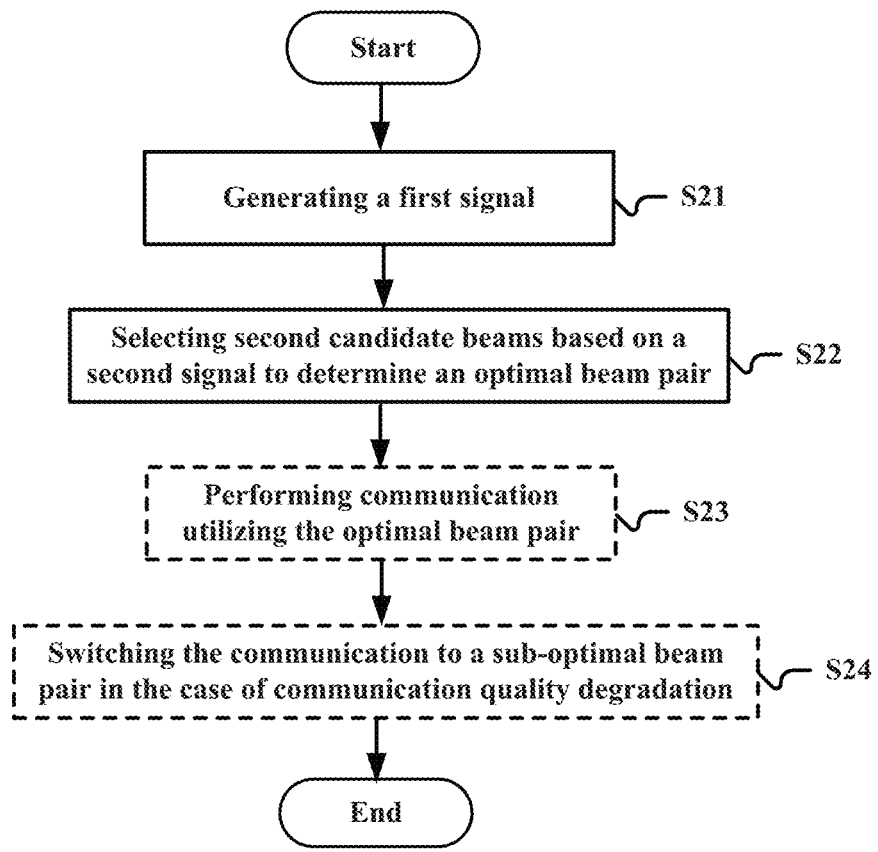
FIG. 18 is a flowchart showing a method for wireless communications according to an embodiment of the present disclosure.

FIG. 18 is a flowchart showing a method for wireless communications according to another embodiment of the present disclosure. The method includes: generating a first signal to be transmitted to a remote wireless communication device (S21); and selecting, based on a second signal transmitted by the remote wireless communication device using each of one or more candidate beams selected based on the first signal, one or more second candidate beams from among a predetermined group of beams, to determine an optimal beam pair which maximizes a channel gain (S22), the optimal beam pair including one of the candidate beams and one of the second candidate beams.

For example, in step S22, direction of arrival estimation is performed respectively based on the second signal to acquire a beam with the largest energy, and one or more beams whose directions are most close to the direction of the beam with the largest energy are selected from among the predetermined group of beams, as the second candidate beam. Further, beam measurement is performed on candidate beam pairs each formed by each of the candidate beams and one of the second candidate beams corresponding to the candidate beam, and a candidate beam pair with the largest measured channel gain is selected as the optimal beam pair. Moreover, although not shown in FIG. 18, the method may further include the step of storing a result of the beam measurement.

Furthermore, as shown by the dashed line blocks in FIG. 18, the above method may further include: performing communication utilizing the optimal beam pair (S23); and switching the communication to a sub-optimal beam pair in the case that a communication quality decreases to be below a predetermined degree (S24).

For example, the sub-optimal beam pair is a beam pair with the largest channel gain among the candidate beam pairs other than the optimal beam pair.

In addition, the sub-optimal beam pair may also be determined as follows: selecting, based on a third signal transmitted by the remote wireless communication device using each of one or more sub-optimal candidate beams selected based on the first signal, one or more third candidate beams from among the predetermined group of beams, to determine a sub-optimal beam pair which includes one of the sub-optimal candidate beams and one of the third candidate beams.

The direction of arrival estimation may be performed in step S22 as follows: selecting multiple continuous antenna units in one dimension of an antenna array to connect to radio frequency links in order to configure an antenna structure, and applying a direction of arrival estimation algorithm to the second signal received through the antenna structure to acquire an azimuth angle of a beam; and selecting multiple continuous antenna units in another dimension of the antenna array to connect to the radio frequency links in order to configure an antenna structure, and applying a direction of arrival estimation algorithm to the second signal received through the antenna structure to acquire an elevation angle of a beam. At least one of the following direction of arrival estimation algorithms may be used: an MUSIC algorithm, an ESPRIT algorithm, and a Capon algorithm.

It should be noted that, the above methods can be performed separately or in combination with each other, and the details thereof are described in the first to the third embodiments, which are not repeatedly described herein.

APPLICATION EXAMPLE

The technology of the present disclosure is applicable to various products. For example, the above mentioned base station may be realized as any type of evolved Node B (eNB) such as a macro eNB and a small eNB. The small eNB such as a pico eNB, micro eNB and a home (femto-cell) eNB may have a smaller coverage range than a macro cell. Alternatively, the base station may also be implemented as any other type of base stations, such as a NodeB and a base transceiver station (BTS). The base station may include a body (also referred to as a base station device) configured to control wireless communications; and one or more remote radio heads (RRHs) arranged in a different position from the body. In addition, various types of user equipments, which will be described below, may each operate as the base station by temporarily or semi-persistently executing a base station function.

Application Example Regarding Base Station

First Application Example

Figure 19:
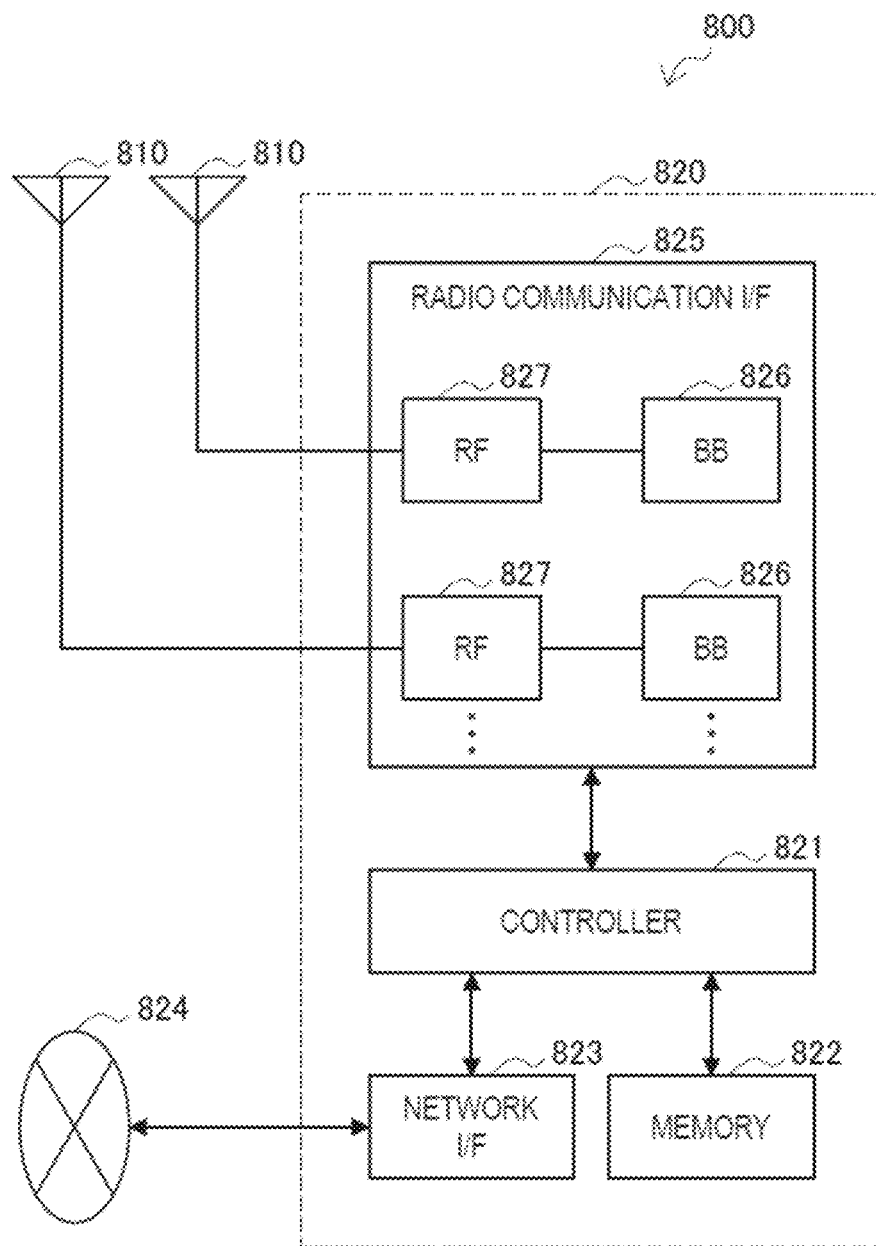
FIG. 19 is a block diagram illustrating a first example of a schematic configuration of an eNB to which the technology of the present disclosure may be applied.

FIG. 19 is a block diagram illustrating a first example of a schematic configuration of an eNB to which the technology of the present disclosure may be applied. An eNB 800 includes one or more antennas 810 and a base station apparatus 820. The base station apparatus 820 and each of the antennas 810 may be connected to each other via a radio frequency (RF) cable.

Each of the antennas 810 includes a single or multiple antennal elements (such as multiple antenna elements included in a multiple-input multiple-output (MIMO) antenna), and is used for the base station apparatus 820 to transmit and receive wireless signals. As shown in FIG. 19, the eNB 800 may include the multiple antennas 810. For example, the multiple antennas 810 may be compatible with multiple frequency bands used by the eNB 800. Although FIG. 19 shows the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an S1 interface and an X2 interface). The network interface 823 may also be a wired communication interface or a wireless communication interface for wireless backhaul. If the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, Media Access Control (MAC), Radio Link Control (RLC), and a Packet Data Convergence Protocol (PDCP)). The BB processor 826 may have a part or all of the above-described logical functions instead of the controller 821. The BB processor 826 may be a memory storing communication control programs, or a module including a processor and a related circuit configured to execute the programs. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As show in FIG. 19, the radio communication interface 825 may include the multiple BB processors 826. For example, the multiple BB processors 826 may be compatible with multiple frequency bands used by the eNB 800. The radio communication interface 825 may include multiple RF circuits 827, as shown in FIG. 19. For example, the multiple RF circuits 827 may be compatible with multiple antenna elements. Although FIG. 19 shows the example in which the radio communication interface 825 includes the multiple BB processors 826 and the multiple RF circuits 827, the radio communication interface 825 may also include a single BB processor 826 and a single RF circuit 827.

In the eNB 800 shown in FIG. 19, the communication unit may be implemented by the radio communication interface 825. At least a part of functions may also be implemented by the controller 821. For example, the controller 821 may perform generation of the first signal and determination of the optimal beam pair by performing the functions of the generation unit 201 and the determination unit 202 shown in FIG. 13, and perform switching of the beam by performing the function of the switching unit 204 shown in FIG. 15.

Second Application Example

Figure 20:
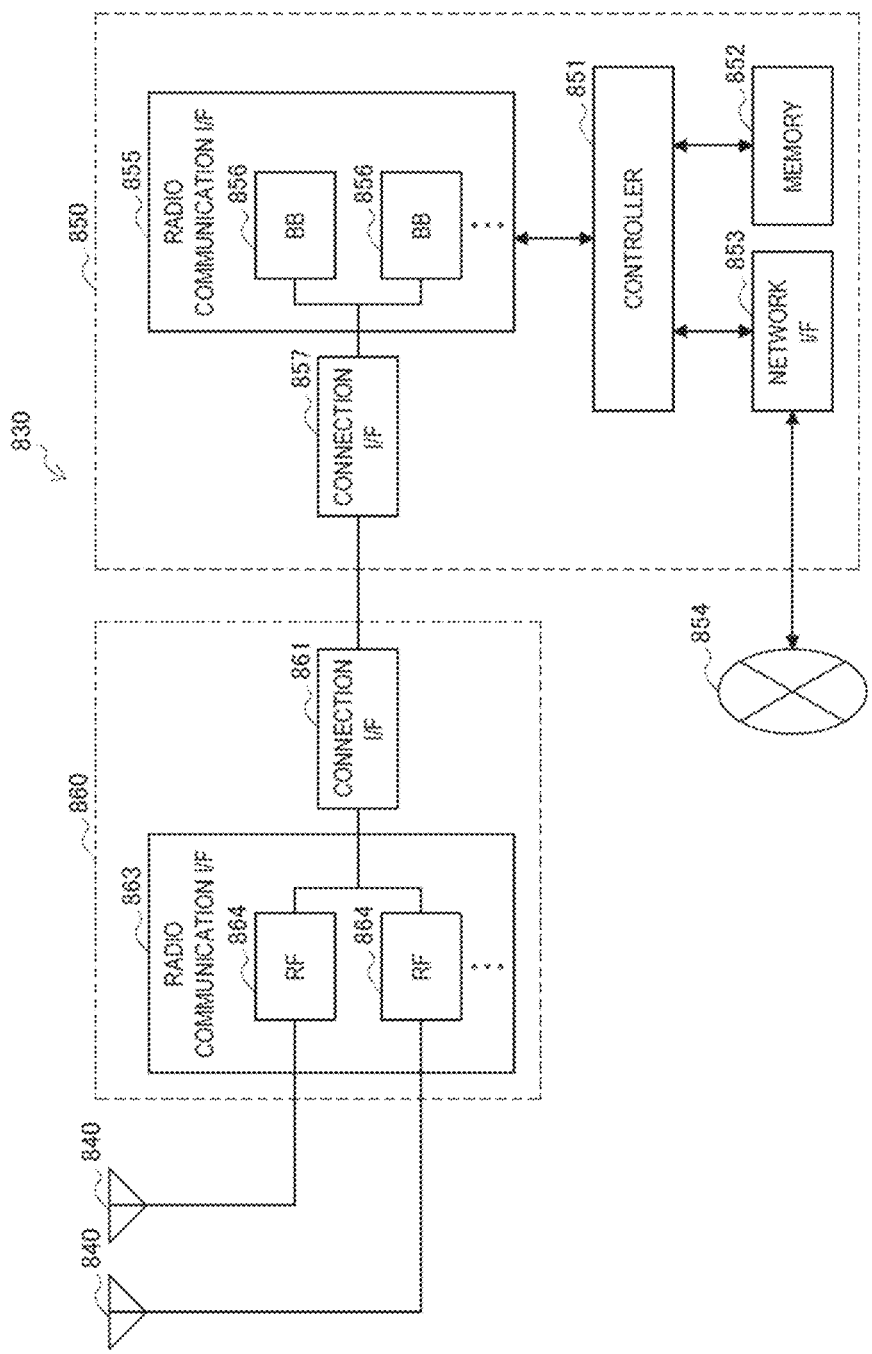
FIG. 20 is a block diagram illustrating a second example of a schematic configuration of an eNB to which the technology of the present disclosure may be applied.

FIG. 20 is a block diagram illustrating a second example of a schematic configuration of an eNB to which the technology of the present disclosure may be applied. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 20, the eNB 830 may include the multiple antennas 840. For example, the multiple antennas 840 may be compatible with multiple frequency bands used by the eNB 830. Although FIG. 20 shows the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 20.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 20, except that the BB processor 856 is connected to an RF circuit 864 of the RRH 860 via the connection interface 857. As show in FIG. 20, the radio communication interface 855 may include the multiple BB processors 856. For example, the multiple BB processors 856 may be compatible with multiple frequency bands used by the eNB 830. Although FIG. 20 shows the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, the RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 20. For example, the multiple RF circuits 864 may support multiple antenna elements. Although FIG. 20 shows the example in which the radio communication interface 863 includes the multiple RF circuits 864, the radio communication interface 863 may also include a single RF circuit 864.

In the eNB 830 shown in FIG. 20, the communication unit may be implemented by the radio communication interface 855 and/or the radio communication interface 863. At least a part of functions may also be implemented by the controller 851. For example, the controller 851 may perform generation of the first signal and determination of the optimal beam pair by performing the functions of the generation unit 201 and the determination unit 202 shown in FIG. 13, and perform switching of the beam by performing the function of the switching unit 204 shown in FIG. 15.

Application Example Regarding User Equipment

First Application Example

Figure 21:
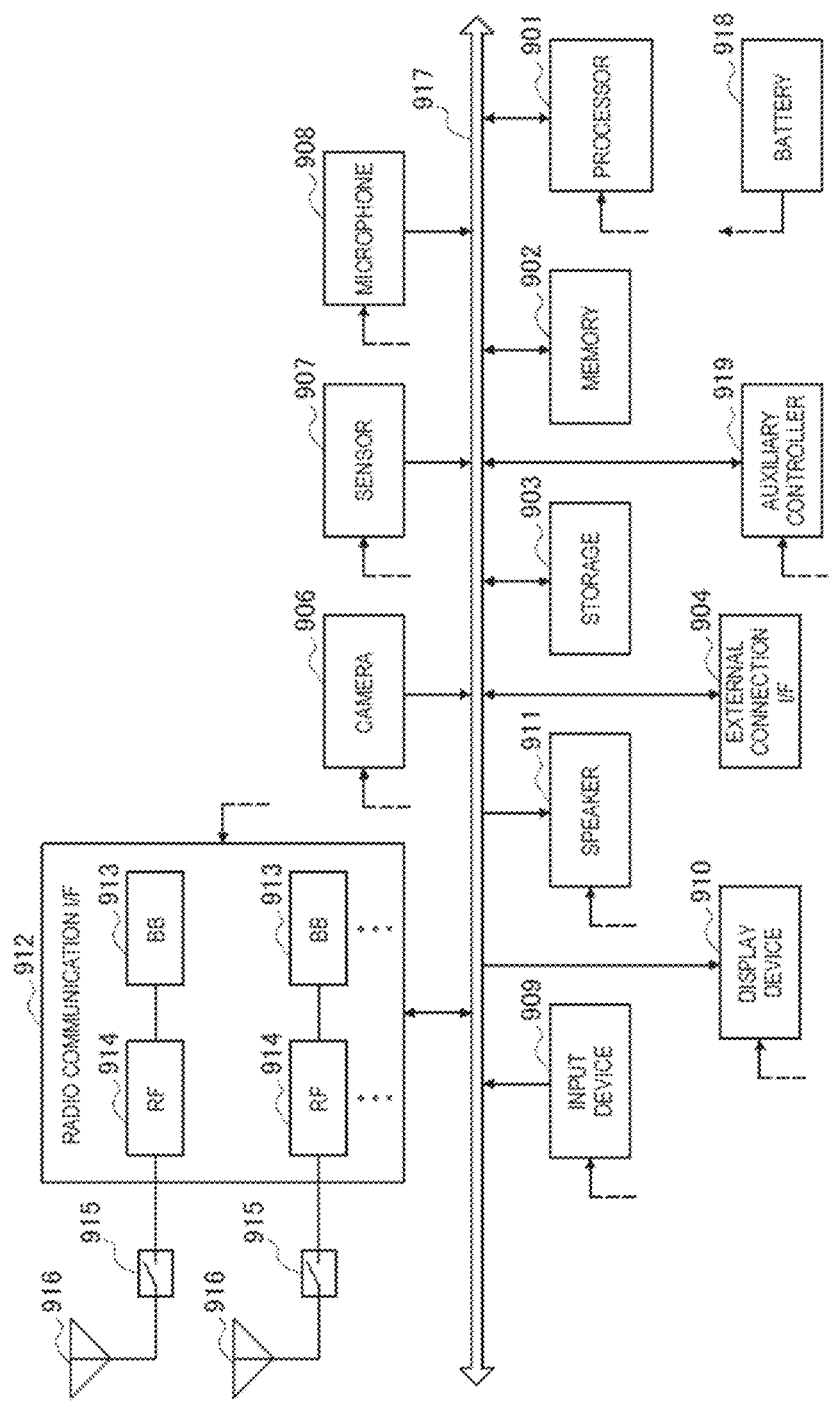
FIG. 21 is a block diagram illustrating an example of a schematic configuration of a smart phone to which the technology of the present disclosure may be applied.

FIG. 21 is a block diagram illustrating an example of a schematic configuration of a smartphone 900 to which the technology of the present disclosure may be applied. The smart phone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smart phone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smart phone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds that are inputted to the smart phone 900 to audio signals. The input device 909 includes, for example, a touch sensor configured to detect touch onto a screen of the display device 910, a keypad, a keyboard, a button, or a switch, and receives an operation or information inputted from a user. The display device 910 includes a screen (such as a liquid crystal display (LCD) and an organic light-emitting diode (OLED) display), and displays an output image of the smart phone 900. The speaker 911 converts audio signals that are outputted from the smart phone 900 to sounds.

The radio communication interface 912 supports any cellular communication scheme (such as LTE and LTE-advanced), and performs a wireless communication. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. The radio communication interface 912 may be a chip module having the BB processor 913 and the RF circuit 914 integrated thereon. The radio communication interface 912 may include multiple BB processors 913 and multiple RF circuits 914, as shown in FIG. 21. Although FIG. 21 shows the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a radio local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna) and is used for the radio communication interface 912 to transmit and receive wireless signals. The smart phone 900 may include the multiple antennas 916, as shown in FIG. 21. Although FIG. 21 shows the example in which the smart phone 900 includes the multiple antennas 916, the smart phone 900 may also include a single antenna 916.

Furthermore, the smart phone 900 may include the antenna 916 for each wireless communication scheme. In this case, the antenna switches 915 may be omitted from the configuration of the smart phone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smart phone 900 shown in FIG. 21 via feeder lines that are partially shown as dashed lines in FIG. 21. The auxiliary controller 919, operates a minimum necessary function of the smart phone 900, for example, in a sleep mode.

In the smart phone 900 shown in FIG. 21, the communication unit may be implemented by the radio communication interface 912. At least a part of functions may also be implemented by the processor 901 or the auxiliary controller 919. For example, the processor 901 or the auxiliary controller 919 may perform selection of the candidate beam and acquisition of the optimal beam pair by performing the functions of the selection unit 101 and the acquisition unit 102 shown in FIG. 4, and perform switching of the beam by performing the function of the switching unit 104 shown in FIG. 12.

Second Application Example

Figure 22:
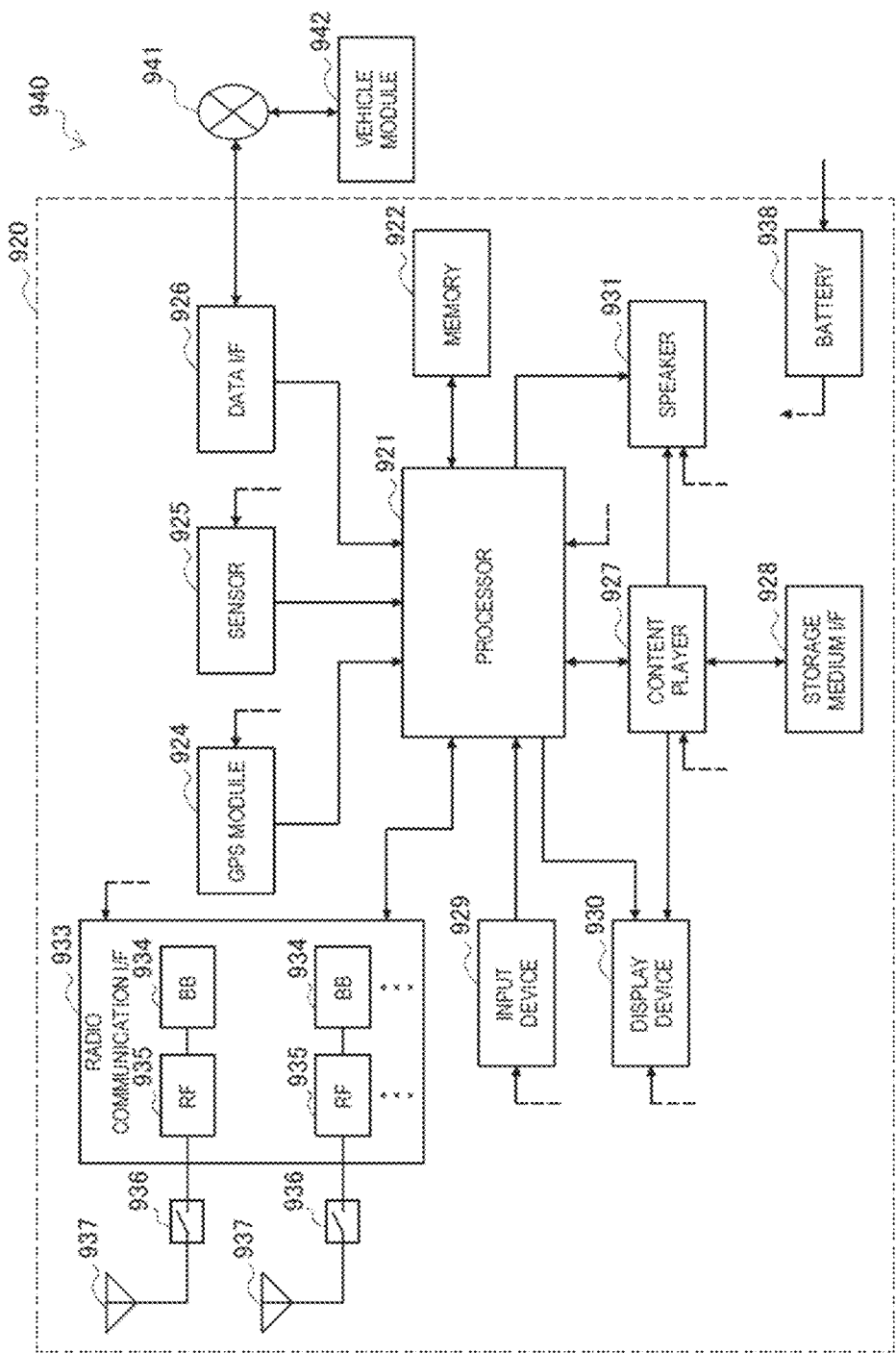
FIG. 22 is a block diagram illustrating an example of a schematic configuration of an car navigation device to which the technology of the present disclosure may be applied.

FIG. 22 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program that is executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or content that is reproduced. The speaker 931 outputs a sounds for the navigation function or the content that is reproduced.

The radio communication interface 933 supports any cellular communication scheme (such as LTE and LTE-Advanced), and performs wireless communication. The radio communication interface 933 may typically include, for example, a BB processor 934 and an RF circuit 935. The BB processor 934 may perform, for example, encoding/decoding, modulating/demodulating and multiplexing/demultiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 22. Although FIG. 22 shows the example in which the radio communication interface 933 includes the multiple BB processors 934 and the multiple RF circuits 935, the radio communication interface 933 may also include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used by the radio communication interface 933 to transmit and receive wireless signals. As shown in FIG. 22, the car navigation apparatus 920 may include the multiple antennas 937. Although FIG. 22 shows the example in which the car navigation apparatus 920 includes the multiple antennas 937, the car navigation apparatus 920 may also include a single antenna 937.

Furthermore, the car navigation apparatus 920 may include the antenna 937 for each wireless communication scheme. In this case, the antenna switches 936 may be omitted from the configuration of the car navigation apparatus 920.

The battery 938 supplies power to the blocks of the car navigation apparatus 920 shown in FIG. 22 via feeder lines that are partially shown as dash lines in FIG. 22. The battery 938 accumulates power supplied from the vehicle.

In the car navigation apparatus 920 shown in FIG. 22, the communication unit may be implemented by the radio communication interface 933. At least a part of functions may also be implemented by the processor 921. For example, the processor 921 may perform selection of the candidate beam and acquisition of the optimal beam pair by performing the functions of the selection unit 101 and the acquisition unit 102 shown in FIG. 4, and perform switching of the beam by performing the function of the switching unit 104 shown in FIG. 12.

The technology of the present disclosure may also be implemented as an in-vehicle system (or a vehicle) 940 including one or more blocks of the car navigation apparatus 920, the in-vehicle network 941 and a vehicle module 942. The vehicle module 942 generates vehicle data (such as a vehicle speed, an engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 2300 shown in FIG. 23) from a storage medium or network, wherein the computer is capable of implementing various functions when installed with various programs.

Figure 23:
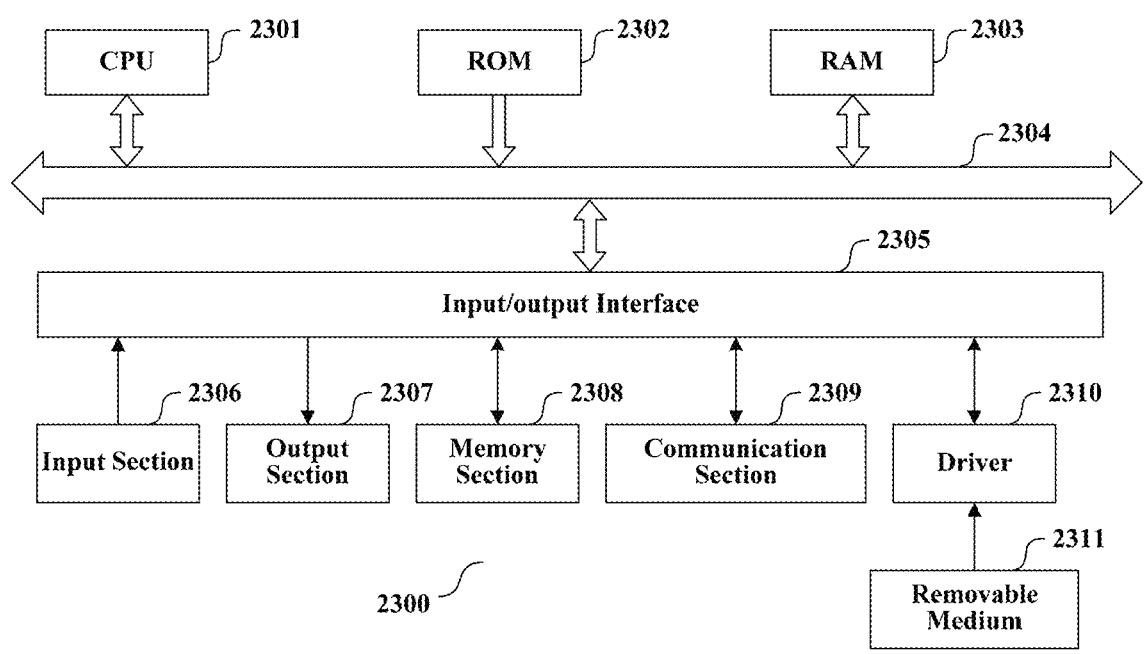
FIG. 23 is a block diagram of an exemplary block diagram illustrating the structure of a general purpose personal computer capable of realizing the method and/or device and/or system according to the embodiments of the present disclosure.

In FIG. 23, a central processing unit (CPU) 2301 executes various processing according to a program stored in a read-only memory (ROM) 2302 or a program loaded to a random access memory (RAM) 2303 from a memory section 2308. The data needed for the various processing of the CPU 2301 may be stored in the RAM 2303 as needed. The CPU 2301, the ROM 2302 and the RAM 2303 are linked with each other via a bus 2304. An input/output interface 2305 is also linked to the bus 2304.

The following components are linked to the input/output interface 2305: an input section 2306 (including keyboard, mouse and the like), an output section 2307 (including displays such as a cathode ray tube (CRT), a liquid crystal display (LCD), a loudspeaker and the like), a memory section 2308 (including hard disc and the like), and a communication section 2309 (including a network interface card such as a LAN card, modem and the like). The communication section 2309 performs communication processing via a network such as the Internet. A driver 2310 may also be linked to the input/output interface 2305, if needed. If needed, a removable medium 2311, for example, a magnetic disc, an optical disc, a magnetic optical disc, a semiconductor memory and the like, may be installed in the driver 2310, so that the computer program read therefrom is installed in the memory section 2308 as appropriate.

In the case where the foregoing series of processing is achieved through software, programs forming the software are installed from a network such as the Internet or a memory medium such as the removable medium 2311.

It should be appreciated by those skilled in the art that the memory medium is not limited to the removable medium 2311 shown in FIG. 23, which has program stored therein and is distributed separately from the apparatus so as to provide the programs to users. The removable medium 2311 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 2302 and the memory section 2308 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for wireless communications, comprising:
   processing circuitry, configured to:
   select, based on receiving of a first signal transmitted from a remote wireless communication device, one or more candidate beams from among a predetermined group of beams;
   acquire, based on the one or more candidate beams, an optimal beam pair which is a beam pair maximizing a channel gain;
   generate, with each candidate beam, a second signal to be transmitted to the remote wireless communication device, so that the remote wireless communication device performs determination of the optimal beam pair based on the second signal;
   perform direction of arrival estimation based on the first signal, to acquire a plurality of beams;
   select, from among the predetermined group of beams, one or more of the acquired beams whose directions are most close to a direction of a beam with a largest energy as the candidate beams;
   select a plurality of continuous antenna units in one dimension of an antenna array to connect to radio frequency links in order to configure an antenna structure, and apply a direction of arrival estimation algorithm to the first signal received through the antenna structure to acquire an azimuth angle of a beam; and
   select a plurality of continuous antenna units in another dimension of the antenna array to connect to the radio frequency links in order to configure the antenna structure, and apply a direction of arrival estimation algorithm to the first signal received through the antenna structure to acquire an elevation angle of a beam.

2. The electronic apparatus according to claim 1, wherein the processing circuitry is configured to perform, based on a reference signal receiving power of the received first signal, selection of the candidate beams and determination of the optimal beam pair.

3. The electronic apparatus according to claim 1, wherein a wireless communication device where the electronic apparatus is located performs communication utilizing the optimal beam pair, and the processing circuitry is further configured to switch the communication to a sub-optimal beam pair in a case that a communication quality decreases to be below a predetermined degree.

4. The electronic apparatus according to claim 3, wherein the sub-optimal beam pair is a beam pair with a largest channel gain among candidate beam pairs determined by the remote wireless communication device based on the second signal other than the optimal beam pair.

5. The electronic apparatus according to claim 3, wherein the processing circuitry is configured to select, from among the predetermined group of beams, one or more beams whose directions are most close to a direction of a beam with g second largest energy as sub-optimal candidate beams, and generate the second signal using the sub-optimal candidate beams so that the remote wireless communication device performs determination of the sub-optimal beam pair.

6. The electronic apparatus according to claim 2, wherein the processing circuitry is configured to select a beam pair with a largest reference signal receiving power as the candidate beam pair, wherein the candidate beam pair comprises a candidate beam and a beam corresponding to the first signal.

7. The electronic apparatus according to claim 6, wherein a wireless communication device where the electronic apparatus is located performs communication with the remote wireless communication device using the optimal beam pair, and the processing circuitry is further configured to switch the communication to a sub-optimal beam pair in a case that a communication quality decreases to be below a predetermined degree, wherein the sub-optimal beam pair is a candidate beam pair with the largest reference signal receiving power among the candidate beam pairs other than the optimal beam pair.

8. The electronic apparatus according to claim 2, wherein the beam corresponding to the first signal is selected from among beams each located in g middle position of each pre-divided group of beams at the remote wireless communication device side, and the candidate beam is selected from among beams each located in the middle position of the each pre-divided group of beams at g present wireless communication device side.

9. An electronic apparatus for wireless communications, comprising:
processing circuitry, configured to:
generate a first signal to be transmitted to a remote wireless communication device;
select, based on a second signal transmitted by the remote wireless communication device using each of one or more candidate beams selected based on the first signal, one or more second candidate beams from among a predetermined group of beams, to determine an optimal beam pair which maximizes a channel gain, the optimal beam pair comprising one of the candidate beams and one of the second candidate beams;
perform direction of arrival estimation based on the second signal respectively to acquire a beam with a largest energy, and select, from among the predetermined group of beams, one or more beams whose directions are most close to a direction of the beam with the largest energy as the second candidate beams;
perform beam measurement on candidate beam pairs each formed by each of the candidate beams and one of the second candidate beams corresponding to the candidate beam respectively, and select a candidate beam pair with the largest measured channel gain as the optimal beam pair;
select a plurality of continuous antenna units in one dimension of an antenna array to connect to radio frequency links in order to configure an antenna structure, and apply a direction of arrival estimation algorithm to the second signal received through the antenna structure to acquire an azimuth angle of a beam; and
select a plurality of continuous antenna units in another dimension of the antenna array to connect to the radio frequency links in order to configure the antenna structure, and apply the direction of arrival estimation algorithm to the second signal received through the antenna structure to acquire an elevation angle of a beam.

10. The electronic apparatus according to claim 9, wherein a wireless communication device where the electronic apparatus is located performs communication with the remote wireless communication device using the optimal beam pair, and the processing circuitry is configured to switch the communication to a sub-optimal beam pair in a case that a communication quality decreases to be below a predetermined degree.

11. The electronic apparatus according to claim 10, wherein the sub-optimal beam pair is a beam pair with the largest channel gain among the candidate beam pairs other than the optimal beam pair.

12. The electronic apparatus according to claim 10, wherein the processing circuitry is configured to select, based on a third signal transmitted by the remote wireless communication device using each of one or more sub-optimal candidate beams selected based on the first signal, one or more third candidate beams from among the predetermined group of beams, to determine a sub-optimal beam pair which comprises one of the sub-optimal candidate beams and one of the third candidate beams.

13. A method for wireless communications, comprising:
selecting, based on receiving of a first signal transmitted from a remote wireless communication device, one or more candidate beams from among a predetermined group of beams;
acquiring, based on the one or more candidate beams, an optimal beam pair which is a beam pair maximizing a channel gain;
generating, with each candidate beam, a second signal to be transmitted to the remote wireless communication device, so that the remote wireless communication device performs determination of the optimal beam pair based on the second signal;
performing direction of arrival estimation based on the first signal, to acquire a plurality of beams;
selecting, from among the predetermined group of beams, one or more of the acquired beams whose directions are most close to a direction of a beam with a largest energy as the candidate beams;
selecting a plurality of continuous antenna units in one dimension of an antenna array to connect to radio frequency links in order to configure an antenna structure, and apply a direction of arrival estimation algorithm to the first signal received through the antenna structure to acquire an azimuth angle of a beam; and
selecting a plurality of continuous antenna units in another dimension of the antenna array to connect to the radio frequency links in order to configure the antenna structure, and apply the direction of arrival estimation algorithm to the first signal received through the antenna structure to acquire an elevation angle of a beam.

* * * * *